(12) United States Patent
Dembo et al.

(10) Patent No.: US 7,171,385 B1
(45) Date of Patent: Jan. 30, 2007

(54) SYSTEM AND METHOD FOR TRADING OFF PUT AND CALL VALUES OF A PORTFOLIO

(75) Inventors: Ron S. Dembo, Toronto (CA); Helmut Mausser, Toronto (CA)

(73) Assignee: Algorithmics International Corp., Bridgetown (KN)

( * ) Notice: Subject to any disclaimer, the term of this patent is extended or adjusted under 35 U.S.C. 154(b) by 320 days.

(21) Appl. No.: 09/718,500

(22) Filed: Nov. 24, 2000

(30) Foreign Application Priority Data

Nov. 26, 1999 (CA) .................................... 2290888

(51) Int. Cl.
*G06Q 40/00* (2006.01)
(52) U.S. Cl. ..................... 705/36 R; 705/35; 705/36; 705/38
(58) Field of Classification Search ............ 705/36, 705/35, 38, 36 R
See application file for complete search history.

(56) References Cited

U.S. PATENT DOCUMENTS

| | | | |
|---|---|---|---|
| 5,761,442 A * | 6/1998 | Barr et al. ................ 705/36 R |
| 5,799,287 A | 8/1998 | Dembo | |
| 5,884,287 A * | 3/1999 | Edesess .................... 705/36 R |
| 6,003,018 A * | 12/1999 | Michaud et al. .......... 705/36 R |
| 6,012,044 A | 1/2000 | Maggioncalda et al. | |
| 6,021,397 A | 2/2000 | Jones et al. | |
| 6,078,904 A * | 6/2000 | Rebane ....................... 705/36 |
| 6,282,520 B1 * | 8/2001 | Schirripa ................. 705/36 R |
| 6,292,787 B1 * | 9/2001 | Scott et al. .................. 705/36 |
| 6,336,103 B1 * | 1/2002 | Baker ........................ 705/36 |
| 6,393,409 B2 * | 5/2002 | Young ........................ 705/37 |
| 6,473,084 B1 * | 10/2002 | Phillips et al. ............. 345/440 |
| 6,546,375 B1 * | 4/2003 | Pang ........................... 705/37 |
| 6,799,167 B1 * | 9/2004 | Gullen et al. ............. 705/36 R |
| 2001/0011243 A1 | 8/2001 | Dembo et al. | |

OTHER PUBLICATIONS

Dembo, Ron S., "Mark-to-Future: A Consistent Firm-Wide Paradigm for Measuring Risk and Return", Risk Management and Analysis. vol. 1: Measuring and Modelling Financial Risk; John Wiley & Sons Lts., 1998, p. 225-236.

Dembo, R., Rosen, D. and D. Saunders, 2000, "Valuation in incomplete markets: an optimization approach," Algo Research Quarterly 3(2), 29-37.

(Continued)

*Primary Examiner*—Ella Colbert
(74) *Attorney, Agent, or Firm*—Bereskin & Parr

(57) ABSTRACT

This invention relates to a system and method for valuing a portfolio in terms of its performance relative to a specified benchmark under a range of future scenarios. In particular, the invention takes a portfolio and calculates two values related to the portfolio: the first value corresponding to an amount by which the value of the portfolio is expected to fall below the value of a benchmark over a given time horizon, and a second value corresponding to an amount by which the value of the portfolio is expected to exceed the value of a benchmark over a given time horizon, in view of the range of different future scenarios. The invention provides a means for determining the portfolio which optimally trades-off these two values, and to evaluate risk/reward performance measures using these two values which can be used to rank instruments, securities or portfolios. The invention also provides a means for pricing portfolio insurance for optimal portfolios.

27 Claims, 14 Drawing Sheets

OTHER PUBLICATIONS

Dembo, Ron S. et al., Mark to future: A Comprehensive Guide to a Revolution in the Evolution of Risk, Algorithmics, Nov. 1999.

Dembo, Ron S. et al., 2000, "The Put/Call Efficient Frontier," Algo Research Quarterly 3(1), 13-25.

Dembo, Ron et al., 1999, "The Practice of Portfolio Replication: A Practical Overview of Forward and Inverse Problems", Annals of Operations Research, 85: 267-284.

Duffie, D., 1996, Dynamic Asset Pricing Theory, Princeton University Press, Princeton, New Jersey, p. 3-19.

King, A.J., 1998, "Martingales and duality in contingent claims analysis: the discrete case," Research Report, IBM Research Division, T.J. Watson Research Center, New York.

Markowitz, H., 1952, "Portfolio Selection," Journal of Finance, 7: 77-91.

Rosen, Dan et al., Scenario Optimization Approach to Pricing in Incomplete Markets, SIAM, Toronto, Jul. 14, 1998.

Saunders, David, Applications of Optimization to Mathematical Finance, Thesis; Graduate Department of Mathematics, University to Toronto, 1997.

Sharpe, W.F., 1998, "Morningstar's Risk-Adjusted Ratings", Financial Analysts Journal 54 (4) Jul./Aug. 21-33.

Bernardo, Antonio E. and Olivier Ledoit, "Gain, Loss, and Asset Pricing", The Journal of Political Economy: Feb. 2000; vol. 108, No. 1, pp. 144-172.

Keating, Con and William F. Shadwick, "A Universal Performance Measure", The Finance Development Centre, London, Current Version: May 2002, pp. 1-41.

Dembo, Ron S. et al. The Put/Call Efficient Frontier, Algo Research Quarterly, Mar. 2000,vol. 3, No. 1.

Dembo, Ron S. et al. Mark to Future: A Comprehensive Guide to a revolution in the evolution of Risk. Algorithmics Incorporated. Nov. 1999 (not released publicly before Nov. 26, 1999) 2.36 to 2.42.

* cited by examiner

SYSTEM AND METHOD FOR TRADING OFF PUT AND CALL VALUES OF A PORTFOLIO

FIELD OF THE INVENTION

This invention relates to a system and method for valuing portfolios. More specifically, this invention relates to a computer-based system and method for valuing a portfolio in terms of values related to its future performance as determined by simulations, relative to a benchmark.

BACKGROUND OF THE INVENTION

Risk management systems are commonly employed by financial institutions, resource-based corporations, trading organizations, governments, and other users to aid in the assessment and management of risk associated with the operations of the user.

One popular example of a known risk management system is the RiskWatch V3.1.2 system, sold by the assignee of the present invention. This system allows users to employ models of financial instruments in the user's portfolio. The system evaluates the models at appropriate time intervals in view of a range of different possible scenarios. Each scenario comprises a set of values for risk factors employed in the models at each time interval, and each scenario has an assigned probability. Resulting attributes or risk values of the instruments when evaluated under each scenario at each time interval of interest are then used to produce one or more measures of risk (i.e. one or more risk metrics), which are examined to assess the risk to the user of holding the portfolio of instruments under the evaluated scenarios. One common risk value is the monetary value of the instrument or instruments under consideration, although other risk values including deltas, gammas and other computed values may also be employed. By combining these risk values appropriately, desired risk metrics can be obtained so that the user can, for example, identify opportunities for changing the composition of the portfolio, to reduce the overall risk of the portfolio or to achieve an acceptable level of risk.

Many prior art risk management systems and methods, however, require that broad simplifying assumptions (e.g. changes in certain values are normally distributed) be made for instruments which do not exist, or more specifically, for instruments which will not be created until some point in the future. This may be the case for a 90-day treasury bill (T-Bill) whose start date is two years away, for example. Simplifying assumptions must also be made for instruments for which appropriate pricing information is not available. These simplifying assumptions are made even in circumstances when such assumptions may be in conflict with the conditions that apply under one or more scenarios.

Instruments I are not limited to financial instruments and can include other instruments, including insurance instruments and commodity options, for example. While an instrument I will most commonly be a financial instrument such as a stock, bond, derivative product, or insurance product for example, generally, an instrument I may be any model which accepts one or more risk factors to simulate a characteristic of a real-world entity including the likelihood of a default by a counter party, for example.

Also, in many known risk assessment systems and methods, risk and reward are assessed on the basis of historical information, in particular, the past performance of the instruments in a portfolio. These systems and methods typically assume, explicitly or implicitly, similar performance in the future, which in some instances, leads to inaccurate results.

Many risk assessment systems and methods ignore issues related to the aging of investments, which include the effects of bond coupons maturing into cash, and of the investment instruments maturing, for example. Liquidity restrictions on instruments in a portfolio, changes in market rates, credit spreads and credit downgrades can also have a significant impact on the value of a portfolio. However, the effects of market, credit, and liquidity risks and the modeling of the correlation between these types of risks are not often dealt with adequately by existing risk assessment systems and methods.

Further, evaluating the trade-off between risk and return in prior art risk management and risk assessment systems and methods may be a prohibitively time-consuming and difficult task, particularly when a users portfolio is large.

It is known that the trade-off between risk and return can be expressed in a concise manner by means of what is known as an "efficient frontier", which allows the optimal trade-offs between competing objectives to be identified. A classic example of this concept is the Markowitz mean-variance efficient frontier which trades off risk, as measured by variance of portfolio returns, and expected return. In this context, portfolios that earn the greatest return for a given amount of risk (or conversely, that incur the lowest risk to obtain a given level of return) are said to be efficient.

Utility theory may then be applied to determine the composition of an investor's optimal portfolio, where the portfolio is defined by a point on a constructed Markowitz efficient frontier. More specifically, given a risk-averse investor, an attainable portfolio which maximizes return for a specified level of risk and which has the highest utility for the investor lies on the efficient frontier, and can be identified using an investor's utility function. A utility function quantifies the desirability of a particular out-come, with higher values indicating greater desirability.

Although it is widely applied, the Markowitz mean-variance framework for trading off risk and reward has certain drawbacks, including its inherent assumptions that returns are normally distributed, and that portfolios are static over time. These assumptions are routinely violated, for example, by portfolios containing optionality, which in addition to displaying non-normal returns, are typically rebalanced at regular intervals. Furthermore, constructing a Markowitz efficient frontier requires one to solve a quadratic program, which can be particularly time-consuming when the subject portfolios are large.

Traditional mean-variance measures and other risk-adjusted measures which may be used to evaluate the performance of an investment, or to aid in the ranking of such investments, are also known in the prior art. For example, Morningstar's risk-adjusted rating is a measure used to rank mutual funds relative to a specified benchmark instrument (i.e. U.S. T-Bills). In measuring a mutual fund's risk, the expected losses of the mutual fund relative to the benchmark instrument are calculated and averaged. In measuring a fund's return, the difference between the cumulative value obtained by investing $1 in the mutual fund and the cumulative value obtained by investing $1 in the benchmark instrument is calculated. The relative returns for all the funds of a group are calculated by dividing each of the risk and return measures obtained by an appropriate base for the group, and may be subsequently ranked.

However, like many other traditional performance measures, the calculation of Morningstar's risk-adjusted ratings assumes that the statistics from historical frequency distributions are reliable predictors of corresponding statistics from a probability distribution of future returns. Furthermore, Morningstar's risk-adjusted ratings are often used to evaluate the performance of a single fund, and do not typically incorporate information on correlations between multiple funds in a portfolio.

Accordingly, a forward-looking risk management system, framework and methodology was developed by the assignee to provide for a more effective and efficient means of calculating performance measures and the tradeoff between risk and reward for different sources of risk including market, credit, and liquidity risk, in a single, unified framework. The system, framework and methodology for determining and analyzing risk as described in U.S. patent application Ser. No. 09/323,680 addresses many of the disadvantages of prior art risk management and risk assessment systems. This system, framework and methodology will be referred to in this specification as the Mark-to-Future (MtF) framework.

The MtF framework provides a foundation on which to construct efficient frontiers and to calculate a wide variety of risk/reward performance measures. Using a scenario-based approach, the MtF framework does not place restrictions on the underlying risk factors or return distributions, and is able to incorporate effects related to the dynamic nature of portfolios, including the effects of cash settlement and active trading strategies, for example. The scenarios can be chosen to reflect not only historically-consistent events, but also extreme future possibilities that may be particularly damaging or rewarding for the portfolio. The scenarios can also be chosen to reflect the constraints imposed on investors in terms of the trades that they are able to execute. The limitations imposed by the finite liquidity of financial markets (i.e. typically, as the size of a trade increases, so too does the investor's per unit cost) can also be incorporated in an analysis within the framework.

Several scenario-based models for analyzing the trade-off between risk and reward are known in the prior art. For example, evaluation of the trade-off between a portfolio's expected profit and expected downside relative to a benchmark has been discussed in U.S. Pat. No. 5,799,287, and in Dembo and Rosen, *The practice of portfolio replication: A practical overview of forward and inverse problems*, Annals of Operations Research, vol. 85, 267–284 (1999).

SUMMARY OF THE INVENTION

The invention relates to a simple, intuitive model which can be used to assess the trade-off between risk and reward with respect to a portfolio's performance under a range of future scenarios. The invention provides for an improved scenario-based model which does not require an explicit normalization constraint for scaling purposes.

The invention also provides for a system and method for constructing efficient frontiers and obtaining performance measures using information inherently contained in the scenarios of an MtF framework. The invention readily accommodates liquidity and other trading constraints, and allows for the quantification of the costs related to these constraints.

The invention also provides for a system and method for pricing new securities, and for pricing portfolio insurance for a given portfolio within the MtF framework.

The invention also provides for a method of portfolio valuation and a system adapted to perform the method, in which the overperformance and underperformance of a portfolio under each of a number of different future scenarios relative to a benchmark are calculated. This permits a portfolio to be valued in terms of its "Put Value" and "Call Value", values which are functions of the portfolio's underperformance and overperformance under the different scenarios relative to a benchmark, respectively.

BRIEF DESCRIPTION OF THE DRAWINGS

For a better understanding of the present invention, and to show more clearly how it may be carried into effect, reference will now be made, by way of example, to the accompanying drawings which show a preferred embodiment of the present invention, and in which.

DETAILED DESCRIPTION OF THE INVENTION

Figure 1:
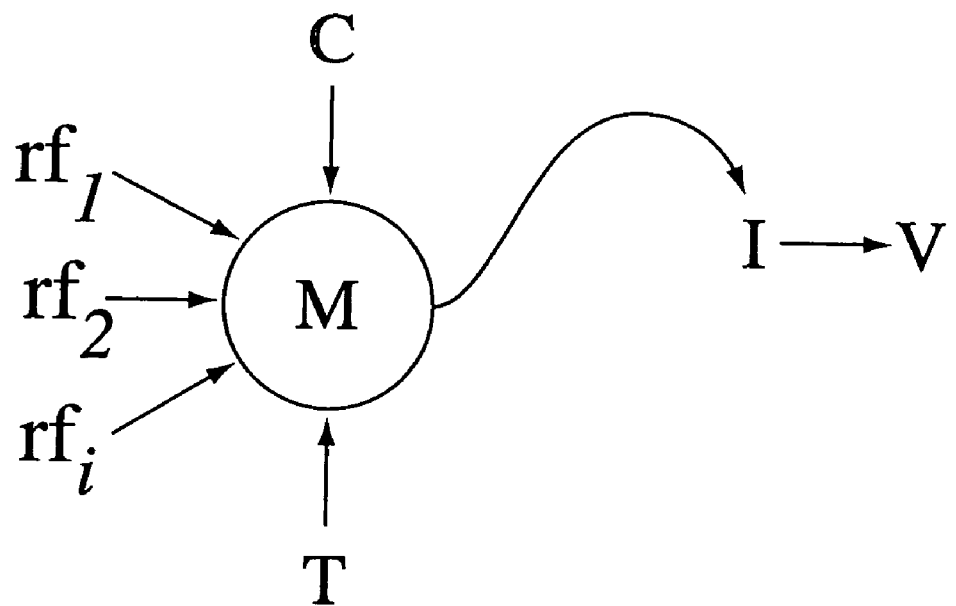
FIG. 1 shows a schematic representation of a prior art mark-to-market valuation of an instrument.

For clarity, before discussing the present invention in detail, a more detailed discussion of prior art risk management systems will be provided with reference to FIGS. 1 through 4. FIG. 1 shows a representation of a known mark-to-market function for an instrument I in a defined portfolio of instruments P (not shown). Referring to FIG. 1, a model M has been created for the instrument I under consideration. Model M takes one or more risk factors $rf_i$ as input and, generally, a time input T, which it then processes for instrument I to obtain a risk value V.

Model M also accepts a calibration value C, as necessary to calibrate the model to current conditions.

The term "risk value" is intended to comprise any suitable measure of risk for the instrument. V can be the monetary value of the instrument or can be another derived risk value, such as a delta, gamma or sensitivity value, expressed in appropriate units. Further, V need not be a single value, as multiple values such as a delta and a gamma can be determined and stored if desired.

Risk factors can comprise a variety of data, including interest rates or rate spreads, and foreign exchange rates, for example. Further, instruments I are not limited to financial investment instruments and can include other instruments, including insurance instruments and commodity options, for example. While an instrument I will most commonly be a financial instrument such as a stock, bond, derivative product, or insurance product for example, generally, an instrument I may be any model which accepts one or more risk factors to simulate a characteristic of a real-world entity, including the likelihood of a default by a counter party, for example.

In order to accurately determine future risk values of an instrument I, it is first necessary to determine the present risk value, or mark-to-market value, for the instrument I and to calibrate the model M. Referring to FIG. 1, risk factors $rf_j$ through $rf_i$ are assigned their present actual (or best estimated) values, T is assigned a zero value corresponding to present time, and V is determined. A calibration value C is determined and applied to M to ensure correspondence of the determined value V and the actual risk value of I at the present time. Calibration value C is stored for model M and is employed for all further calculations until the model is re-calibrated at a new time T=0.

Figure 2:
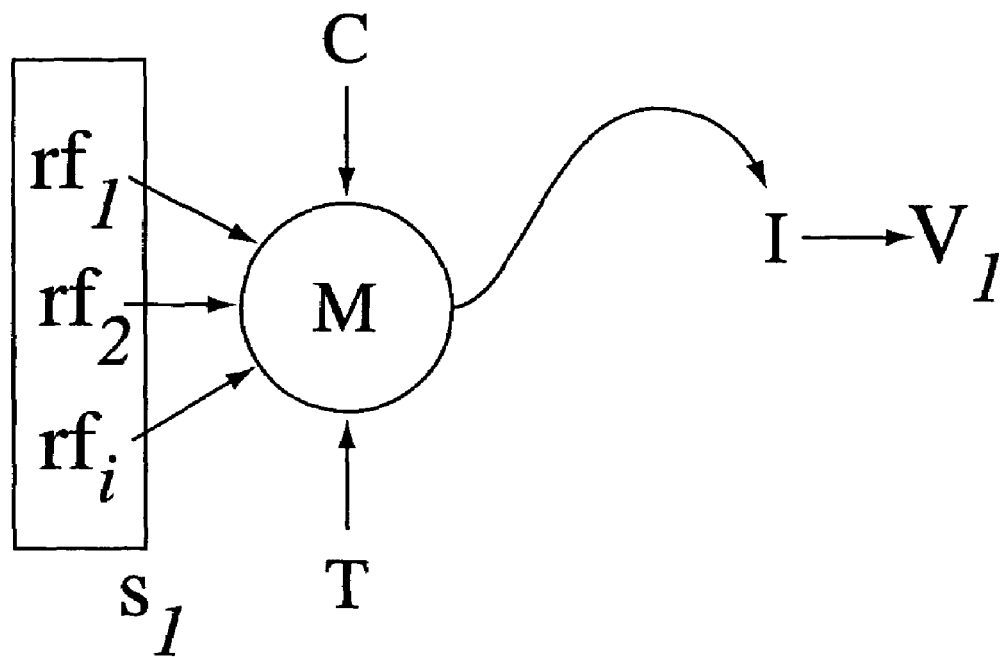
FIG. 2 shows a schematic representation of a prior art mark-to-future valuation of an instrument for a single scenario.

Once all models M for all instruments I in portfolio P are calibrated and mark-to-market risk values are determined for each instrument I in portfolio P, the risk analysis can be performed for P by applying a set of possible future scenarios and a time T to models M to obtain mark-to-future risk values for each instrument I. A scenario s (not shown) comprises a vector with a value for each risk factor $rf_i$ employed by a model M in portfolio P, and each scenario has associated with it a probability of its likelihood of occurrence. FIG. 2 shows model M being evaluated at a selected time T under scenario $s_j$, to produce a value $V_1$ which is the risk value of instrument I at time T for the values of the risk factors defined in scenario $s_j$.

Figure 3:
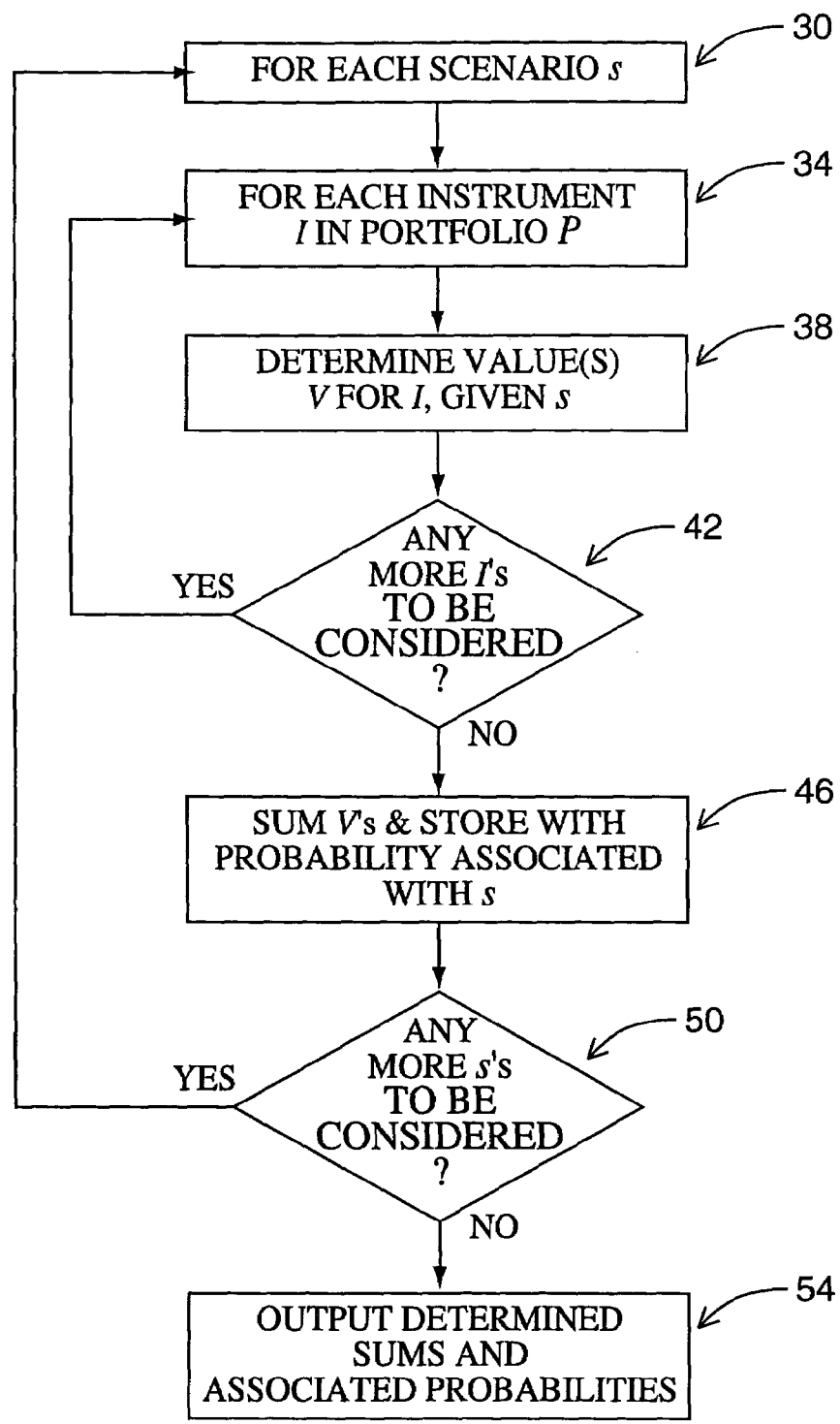
FIG. 3 shows a flowchart of a prior art method of determining a risk metric in the form of a distribution of portfolio values and probabilities.

FIG. 3 is a flowchart illustrating a prior art method of producing a risk metric for a predefined portfolio P.

At step 30, an outer loop for portfolio P is established to process each scenario s in turn. At step 34, an inner loop is established to process each instrument I in turn.

At step 38, the risk value V of the present instrument I under consideration for the present scenario s is determined.

At step 42, a determination is made as to whether any other instruments I remain to be considered. If the condition is true, the flow of method steps proceeds to step 34 and the next I is selected and considered. If the condition is false, the flow of method steps proceeds to step 46, at which the determined values for the instruments I are summed to get a total risk value for the portfolio P which is stored, along with the probability assigned to scenario s. If there are multiple units of instruments I in portfolio P, the total risk value calculated at step 46 is weighted accordingly (e.g. multiplying the value of an instrument I by the number of units of that instrument, the product used in calculating the total risk value).

At step 50, a determination is made as to whether any scenarios s remain to be considered. If the condition is true, the flow of method steps proceeds to step 30 at which the next scenario s is selected for consideration, and steps 34 through 50 are performed again for the selected scenario s. If the condition is false, the flow of method steps proceeds to step 54, at which the summed risk values and their associated probabilities are outputted, and the method terminates. Often this method will be performed at many different times T.

Figure 4:
FIG. 4 shows a probability versus value distribution produced by the method of FIG. 3.

FIG. 4 shows a possible output of the process of FIG. 3, namely a distribution plot of portfolio P's monetary value versus its probability of occurring. Such a distribution is then analyzed by the user to determine a variety of risk-related measures such as Value-at-Risk (VaR) (i.e. the loss that is likely to be exceeded with a specified probability) or other risk metrics.

The assignee of the present invention has developed a system, framework and methodology for determining and analyzing risk, that attempts to address the deficiencies in prior art risk management systems and methods. This development is referred to herein as the Mark-to-Future (MtF) framework, and is described in U.S. patent application Ser. No. 09/323,680, the contents of which are incorporated herein by reference.

Figure 5:
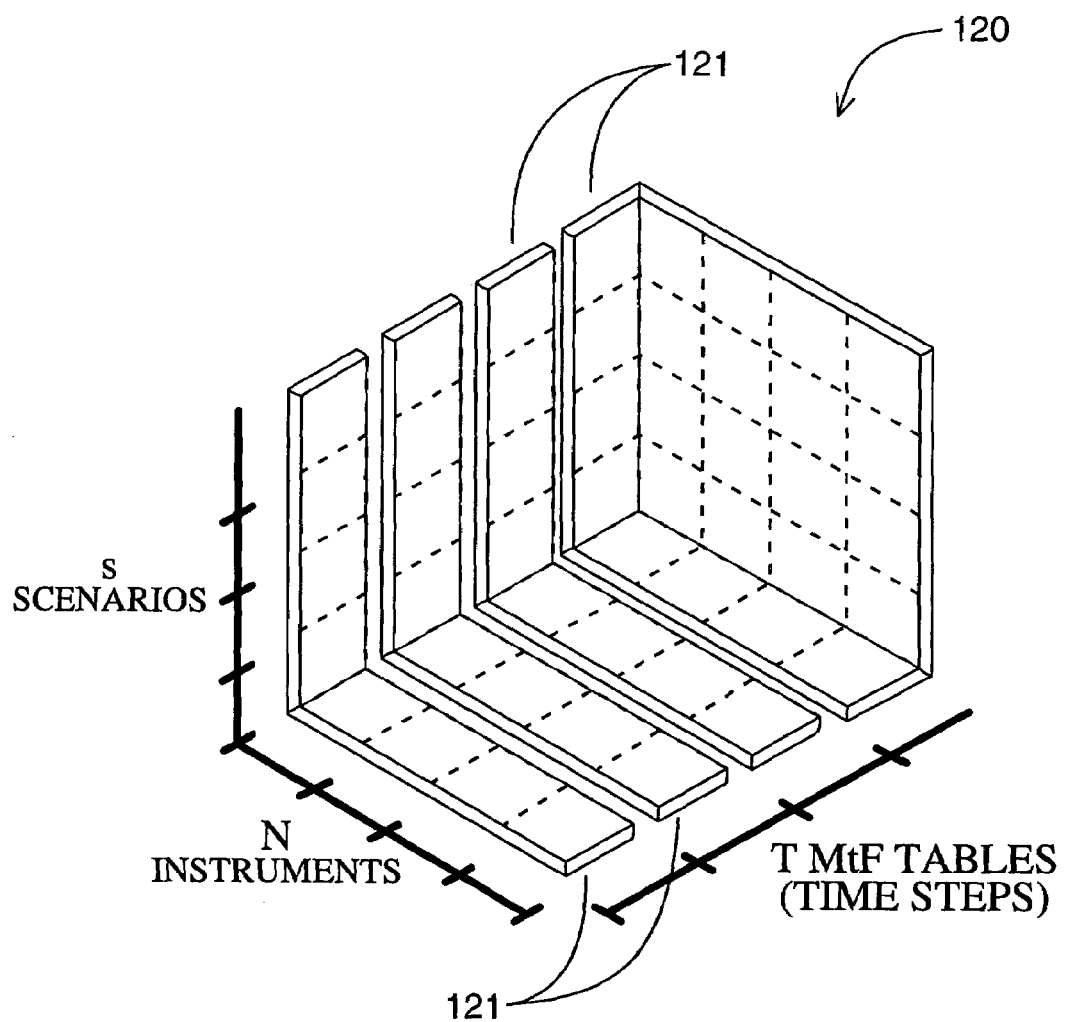
FIG. 5 is a schematic diagram illustrating a portfolio Mark-to-Future cube.

Referring to FIG. 5, at the foundation of the MtF framework is the generation of a three-dimensional MtF cube 120 consisting of a series of MtF tables 121. Each MtF table 121 has dimensions $S_t \times N$, where $S_t$ is the number of possible future scenarios under consideration and N is the number of instruments. In variant embodiments of the invention, the number of scenarios $S_t$ may vary over a series of time steps (as denoted by the subscript). In the preferred embodiment of the invention, however, we assume that the number of scenarios per time step is constant. While in the preferred embodiment the MtF cube 120 comprises three physical dimensions, there can be many more logical dimensions, and in variant embodiments of the invention, the MtF cube 120 can comprise any number of physical or logical dimensions.

Each MtF table 121 is associated with a given time step t over an overall time horizon of T steps. A pre-computed MtP Cube 120 provides a basis onto which the mapping of all financial products and all positions in those products can be accommodated, thereby enabling the full characterization of future portfolio distributions for multiple types of portfolios through time.

Each cell in the MtF Cube 120 contains a simulated expected value (the MtF Value) of a given instrument under a given possible future scenario and time step. These simulated values incorporate different types of risk, including market, credit, and liquidity risks. This is possible since these various types of risks and the correlation between these various types of risks are embodied in the scenarios that make up the data in the MtF cube 120. The values in the MtF cube 120 inherently may also incorporate the dynamic nature of portfolios, such as the effects of cash settlement or active trading strategies. In certain applications, other sensitivity measures such as an instrument's delta or its duration, for example, may be included in addition to the MtP value. Therefore, in the general case, each cell of a MtF Cube 120 may contain a vector of risk factor dependent measures for a given instrument under a given scenario and time step. In other variant embodiments of the MtF framework, the vector may also contain a set of risk factor dependent cashflows for each scenario and time step.

The MtF framework, and in particular the MtP cube 120 and the data contained in the MtF cube 120, provide a foundation for a wide variety of means for assessing risk and reward associated with a portfolio.

Figure 6:
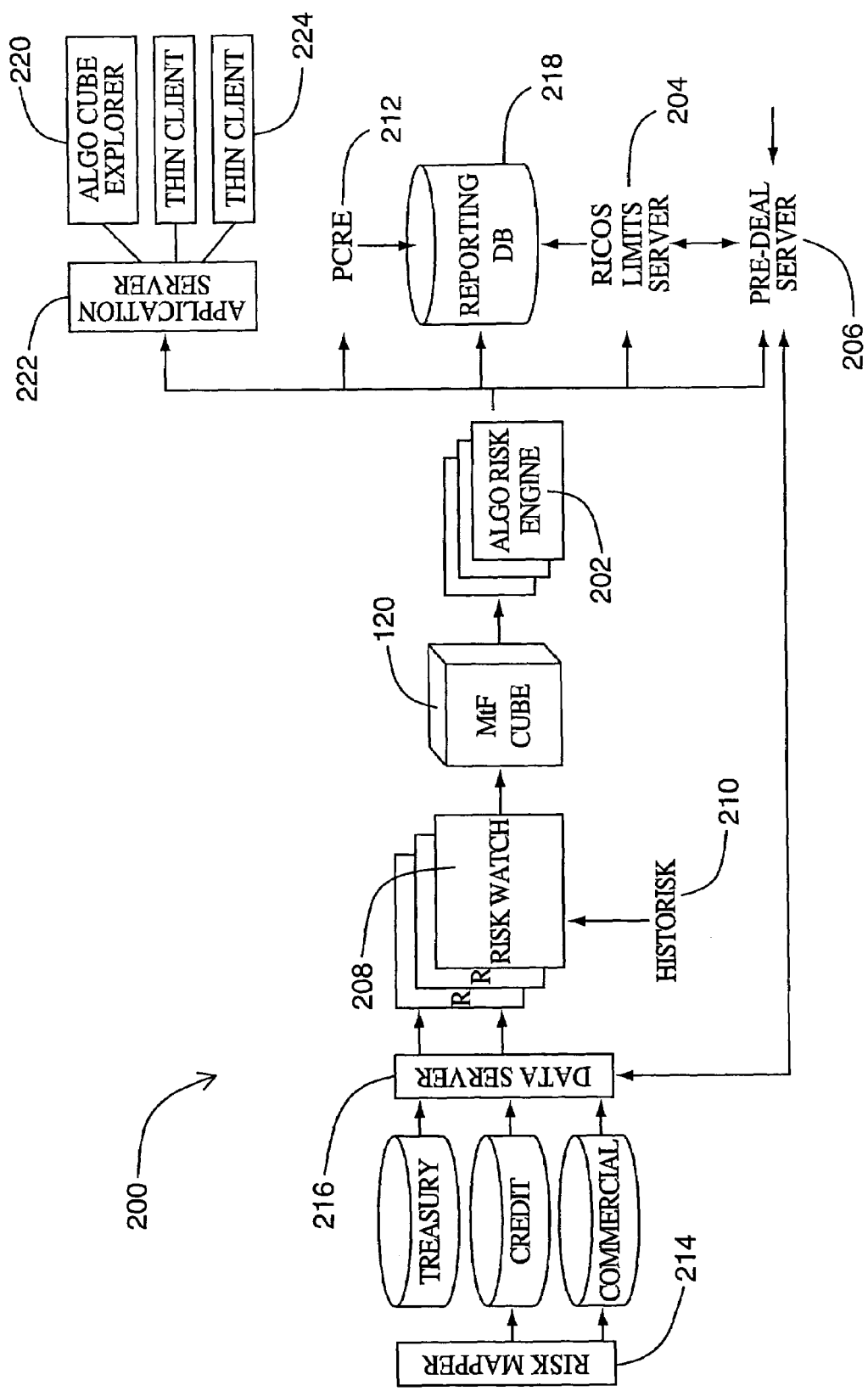
FIG. 6 is a schematic diagram illustrating a computer system implementing the Mark-to-Future framework.

Referring now to FIG. 6, a block diagram of a computer system is shown generally as 200. A brief discussion of system 200 is provided so that the reader may understand the utility of the present invention in the context of system 200, in which it is contained.

System 200 can be implemented as part of the MtF framework. This framework is supported by a distributed component based architecture. This architecture, which we refer to as the Mark-to-Future architecture, provides an open scalable system with well-defined system interfaces that enable integration with existing systems while also allowing system 200 to evolve.

A traditional risk framework takes a portfolio and position information as input to a scenario analysis. In contrast, system 200 includes only the instrument detail and delays the aggregation of the results into various portfolio hierarchies until after the scenario analysis. The result of the scenario analysis is the MtF cube 120 which holds the value of each instrument under each scenario and time point.

Risk Engine 202 (e.g. Algorithmics' Algo Risk Engine) performs risk processing to produce market, liquidity, and credit risk measurements. The method of the present invention can be performed by Risk Engine 202. The present invention resides in Risk Engine 202. Risk Engine 202 combines the results calculated by RiskWatch 208 and stored in MtF cube 120 with data from risk controlling system (RICOS) 204 to produce a requested risk measurement. In the case of exposure calculations, Risk Engine 202 considers account credit mitigation approaches such as, for example, netting hierarchies, credit mitigation portfolios, and credit-to-close.

RICOS 204 is a limits management component enabling both overnight and real-time limits assessment. RICOS comprises input data components, a limits server, and a graphical interface which is used for limits configuration and management. Limits management capability includes the ability to create, modify, and remove time varying limits, deal reservation capability, and limits cascading. Within RICOS 204, a RICOS consolidation cube (not shown) is the key data structure for exposure consolidation and limits management. The consolidation cube consists of different dimensions: risk-taker, risk-on, and product group. Each intersection of the consolidation cube is a consolidation point at which multiple limits types can be stored and checked. Inputs to RICOS 204 may comprise, for example: credit data (e.g. netting hierarchies, credit states, transition matrices, etc.), limit structures and exposure profiles via Risk Engine 202.

The component managing pre-deal capabilities is the Pre-Deal Server (PDS) 206. PDS 206 is a full transaction system which is an XML-based product capable of supporting multiple languages (i.e. a protocol enabling e-commerce activities in the field of financial derivatives). PDS 206 supports requests for the following analyses, for example:

a) Pre-deal assessment with Mark-to-Market (MtM) plus add-on calculated exposures;
b) Pre-deal assessment using full simulation based exposures; and
c) Pre-deal limits checking with MtM plus add-on calculated exposures.

The resulting pre-deal analysis is configurable, ranging from a simple go/no-go result to a graphical display of the exposure profile through time. Pre-deal assessment evaluates the change in exposure if a user chooses to proceed with the transaction. Pre-deal limits checking extends the assessment by determining the impact to the limits structure. There are two primary methods for computing exposure: Mark-to-Market plus add-on (i.e. plus a spread), and full simulation. With Mark-to-Market plus add-on, the potential future exposure is estimated using a simple, computationally inexpensive look-up of an add-on amount. The add-ons can either be static, as defined in the Bank of International Settlement (BIS) methodology for example, or dynamic, in which case, the add-on factors are frequently recalculated by RiskWatch 208 to reflect the current state of the market risk factors that drive the exposure profile of the portfolio. Full simulation calculates the exposure using the more computationally expensive full simulation approach. In this case, RiskWatch 208 calculates a MtF cube 120 representing the value of the deal for each scenario and time point, and Risk Engine 202 combines the result with the rest of the portfolio.

RiskWatch 208 provides a set of methodologies to aggregate, simulate, measure, restructure and manage both credit and market risk. RiskWatch 208 has been designed as the modeling engine in a comprehensive risk management framework for not only meeting Bank of International Settlement (BIS) guidelines, but also for active risk management and capital allocation. RiskWatch 208 creates the MtF cube 120 by revaluing a set of instruments for each scenario and each time point. RiskWatch 208 receives input such as, for example: treasury products, financial models, and scenarios from HistoRisk 210 described below.

HistoRisk 210 is a scenario generator which provides the scenario sets to RiskWatch 208 in order for RiskWatch 208 to compute values of the MtF cube 120. HistoRisk 210 implements many scenario generation techniques such as:

a) standard Monte Carlo scenarios;
b) multi-step Monte Carlo scenarios, which are required to calculate potential exposures for credit risk,
c) stratified sampling, which involves separating an underlying distribution into ranges and sampling from each range by its probability; and
d) Sobol sequences, a form of quasi-Monte Carlo technique, where samples are taken to ensure that they are approximately evenly spaced.

HistoRisk 210 takes as input time series data and outputs scenarios and variance/covariance matrices to RiskWatch 208.

Portfolio Credit Risk Engine (PCRE) 212 is an integrated market and credit risk framework that generates portfolio credit risk analysis including credit Value at Risk (VaR), as well as stress tests, based on the joint distributions of credit migrations across counterparties and market risk factors. PCRE 212 supports the simultaneous incorporation of multiple migration models that may be applicable to different product sectors, such as treasury and commercial banking, across an institution. PCRE 212 takes as input, for example: credit states from RICOS 204, counterparty exposure profiles from Risk Engine 202 and credit state scenarios from HistoRisk 210.

The data required for system 200 is often scattered over other systems, each of which may have a unique data format and data conventions. RiskMapper 214 is designed as a flexible mapping tool that maps data exported from these other systems into an input format suitable for system 200 RiskMapper 214 shields users from the underlying mapping code by providing a simple graphical user interface to define the data mapping rules.

Once source data has been mapped by RiskMapper 214, it is stored in Algo Input Database (AIDB) 216 data server. AIDB 216 comprises a relational database and set of tools for populating, modifying, and selecting the data for analysis by RiskWatch 208.

Reporting database 218 stores the results of risk measure calculations. These results need to be saved for enterprise reporting. Reporting database 218 is a relational database designed to store the enterprise risk results such as value-at-risk, sensitivities, and exposures, for example. Reporting database 218 forms the basis of a reporting function, including batch oriented reporting as well as interactive adhoc queries.

Cube explorer 220 is a graphical user interface that allows interactive analysis of the data in MtF cube 120. Application server 222 hosts cube explorer 220 and a plurality of clients 224 which receive reporting data from system 200.

The flexibility of this MtF framework and its computational efficiency allows the MtF framework to be applied to a wide range of problems.

For example, in the preferred embodiment of the present invention, the MtF framework is adapted to value a portfolio in terms of its expected downside losses and upside gains under a range of future scenarios, relative to a chosen benchmark.

Consider the simulation where a portfolio's monetary value is to be determined over a single period. The MtF simulation is performed on a set of basis instruments, over a set of possible future scenarios and an appropriate time horizon. The financial products comprising the portfolio are mapped to this set of instruments, and the portfolio is mapped to the financial products. The result is a set of MtF values for the portfolio, one for each scenario.

Some of the scenarios will have resulted in gains for the portfolio and some will have resulted in losses. The gains and losses could be absolute or computed with respect to a benchmark, the benchmark itself being subject to the same simulation.

For example, the chosen benchmark may be a target security or a portfolio that is to be replicated (e.g., a stock index or an exotic option), an alternative investment (e.g., cash), or a historical portfolio value against which gains and losses are calculated.

Figure 7A:
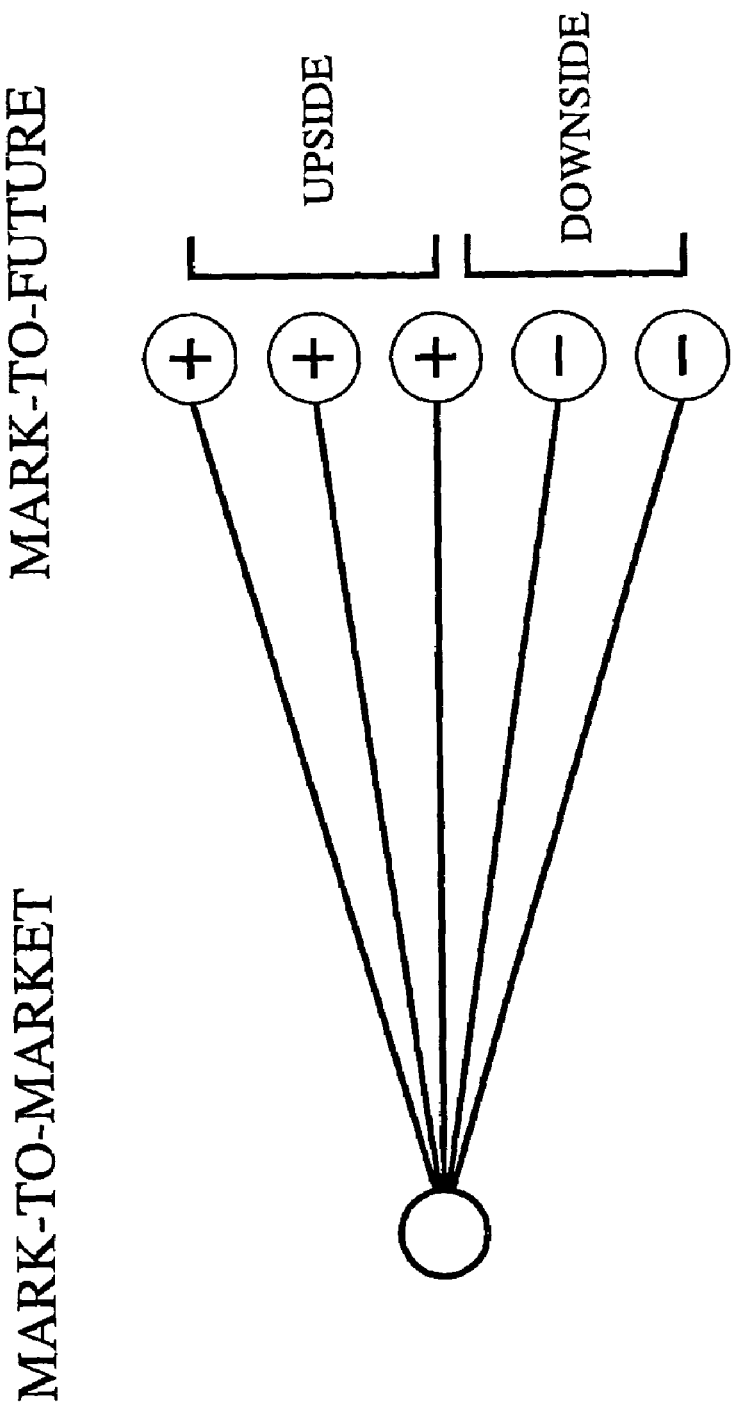
FIG. 7a is a schematic diagram illustrating a portfolio as comprising a distribution of unrealized upside gains and downside losses.

If probabilities are associated with each scenario (that is, the probability of each scenario occurring), a distribution of unrealized gains (i.e. the portfolio's "upside") and a distribution of unrealized losses (i.e. the portfolio's "downside") relative to the benchmark can be obtained. Referring to FIG. 7a, if the portfolio's value exceeds that of the chosen benchmark in a given scenario, then the difference between their values is an unrealized gain and contributes to the portfolio's upside. Conversely, if the value of the chosen benchmark exceeds that of the portfolio in a given scenario, then the difference between their values is an unrealized loss and contributes to the portfolio's downside.

Figure 7C:
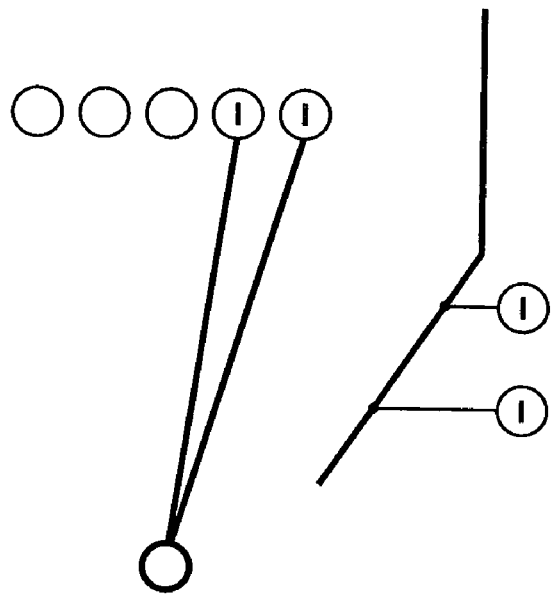
FIGS. 7b and 7c are schematic diagrams illustrating the payoffs of a portfolio representing upside and downside respectively.
Figure 7B:
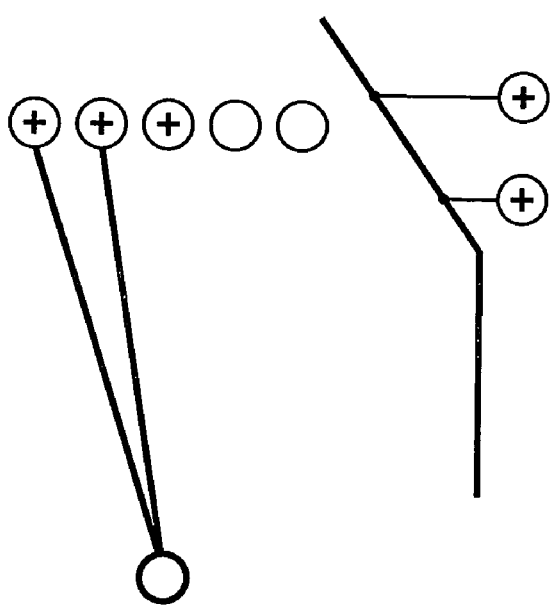

Referring to FIG. 7b, it can be shown that the portfolio's upside has the same payoffs as a European call option, with strike equal to the benchmark value, and with a maturity equal to the horizon. Similarly, referring to FIG. 7c, it can be shown that the portfolio's downside has the same payoff as a short position in a European put option, with strike equal to the benchmark value, and with a maturity equal to the horizon. Thus, according to the present invention, a portfolio can be valued in terms of its possible future upside and downside payoffs: the risk and reward associated with the portfolio can be calculated by placing a value on the put option and call option respectively. The interpretation of a portfolio's possible future upside and downside payoffs in the context of put and call options allows investors to assess the trade-off between the risk and reward of a portfolio in a simpler, more intuitive manner.

Furthermore, this is an inherently forward-looking view of risk and reward since the value of the put or call option is dependent exclusively on future events, although the past might influence the choice of scenarios. It is also easy to evaluate multiple choices for the scenario probability weights under the MtF framework.

We now discuss different applications where a portfolio's upside and downside can be used in the managing of risk associated with portfolios.

A. Measurement and Ranking of Portfolios

Many risk or reward measures can be derived from the distribution of computed unrealized gains or losses. For example, the VaR measure for a portfolio can be calculated as a specified percentile of the downside, using the mark-to-market value of the portfolio as the benchmark. Other measures may include expected shortfall and standard deviation, for example.

In the preferred embodiment of the invention, a Put Value of a portfolio is calculated by determining the expected downside loss associated with the portfolio under the range of possible future scenarios. This represents one method of valuing the put option and takes into account the probabilities of scenarios occurring.

Similarly, a Call Value of a portfolio is calculated by determining the expected upside gain associated with the portfolio under the range of possible future scenarios. This represents one method of valuing the call option and takes into account the probabilities of scenarios occurring.

In variant embodiments of the invention, the Put Value of a portfolio may alternatively be calculated by determining the maximum downside gain or some other measure related to the downside associated with the portfolio given a set of possible future scenarios and probabilities of each scenario occurring. Similarly, the Call Value of a portfolio may alternatively be calculated by determining the maximum upside gain or some other measure related to the upside associated with the portfolio given a set of possible future scenarios and probabilities of each scenario occurring. In variant embodiments of the invention, the Put Value and Call Value of a portfolio may be calculated based on a single future scenario.

The Put and Call values of an existing portfolio can be used to obtain a risk/reward performance measure for the portfolio, relative to a benchmark. In so doing, the Put Value is essentially used as a risk measure associated with the future performance of the portfolio (rather than variance of expected returns as is known, for example) and the Call Value is used as a reward measure associated with the future performance of the portfolio (rather than expected return as is known, for example). A risk/reward performance measure that incorporates a Put Value and/or a Call Value may be evaluated for each of a set of portfolios or each of a set of instruments (for example, a set of mutual funds, or a set of individual securities). The resultant performance measures can then be compared permitting the portfolios or the instruments in the set to be ranked. Any function of Call Value, Put Value, or both may be used in obtaining a performance measure. Some possible performance measures include, for example: Call-$\lambda$(Put) (where $\lambda$ is given a specified value) and Call/Put.

B. Constructing Efficient Portfolios (Optimization Model)

Given a performance measure (or an investor's utility function in the context of the discussion below), one can formulate an optimization model to find the portfolio that obtains a best possible score according to the performance measure used. In this case, there is no single existing portfolio that is to be evaluated, only a set of constraints that define feasible portfolios.

One approach to this optimization problem is to construct an efficient frontier, and to then use utility theory to select an efficient portfolio.

The trade-off between risk and reward can be interpreted as a trade-off between the expected downside and the expected upside of a portfolio in the context of the present invention. An efficient portfolio can be defined as a portfolio which maximizes the expected upside for a given amount of expected downside. The upside and downside, as explained earlier in this specification, match the payoffs of a long call and a short put option, respectively, on the future value of a portfolio relative to the chosen benchmark. Thus, we can define a portfolio's Call Value and Put Value to be the expected upside and expected downside, respectively, and refer to the optimal trade-offs between these quantities as the Put/Call Efficient Frontier.

The Put/Call Efficient Frontier is defined by the solution to:

| Problem 1: | v(k) = maximize: | Call Value |
| | Subject to: | Put Value ≤ k |
| | | trading constraints | for all $k \geq 0$, where k is a variable corresponding to a value of specified expected downside. The variables in the problem above are the sizes of the positions which define a portfolio. When calculating a portfolio's Call Value and Put Value, the expectation is taken over a set of probability-weighted scenarios, the data for which is stored in the MtP cube 120 of FIGS. 5 and 6.

Trading constraints include, for example, liquidity constraints that apply to the instruments of a portfolio Liquidity constraints reflect the relationship between price and trade volume for each security. Other trading constraints may include a budget or limits on various groups of instruments, for example.

In the preferred embodiment of the method of the invention, we assume a single-period time horizon T, although the results extend naturally to multiple time horizons, which may be used in variant embodiments of the invention.

For each value of k, the solution to Problem 1 is obtained and multiple portfolios are evaluated for which the largest possible expected upside while not incurring more than k units of expected downside are calculated. As the problem is solved for further values of k, as k is increased from zero, the optimal solution values define the Put/Call Efficient Frontier.

In a variant embodiment of the invention, the Put/Call Efficient Frontier may be alternatively constructed by minimizing the Put Value subject to obtaining a specified level of Call Value.

The generation of the Put/Call Efficient Frontier requires a linear program to be solved, which is mathematically formulated below.

Suppose there are n securities, indexed by i, available for constructing a portfolio. Possible states-of-the-world at a time step t are represented by s scenarios, indexed by j. We assume that the benchmark is a security which grows in value at a specified rate in each scenario. For example, one could choose a risk-free security as the benchmark and set the growth rates in all scenarios to be consistent with the risk-free rate. By incorporating the benchmark in terms of a set of growth rates, the subject invention does not require an explicit normalization constraint for scaling purposes.

In the preferred embodiment of the invention, different tranches of the same security are considered to be separate instruments. For example, suppose a particular stock trades at one price for up to 10,000 shares and another price for over 10,000 shares (the liquidity premium), then these two tranches of the stock are considered to be two distinct instruments in the optimization model.

One unit of security i, which is currently worth qi, qi being the current mark-to-market value of security i, attains a Mark-to-Future value of $M_{ji}$ in scenario j. Likewise, an investment of $q_i$ in the benchmark yields a value of $r_j q_i$ in scenario j. For example, a benchmark growth rate of $r_j > 1$ means that the benchmark appreciates in value.

A portfolio that consists of positions $x_i$ in each security i achieves an upside gain, relative to the benchmark, of:

$$u_j = \max\left[\sum_{i=1}^n (M_{ji} - r_j q_i) x_i, 0\right]$$

and a downside loss, relative to the benchmark, of:

$$d_j = \max\left[\sum_{i=1}^n (r_j q_i - M_{ji}) x_i, 0\right]$$

in scenario j. Note that the equation $$u - d = (M - rq^T)x \quad (1)$$

together with the conditions $$u \geq 0$$

$$d \geq 0$$

$$u^T d = 0$$

correctly specifies the upside and downside across all scenarios. In this specification, equation (1) is referred to as the tracking constraint, and $u^T d = 0$ is referred to as the complementarity constraint.

To simplify the notation, we define the net gain that results from holding one unit of security i instead of the benchmark in scenario j to be $$V_{ji} = M_{ji} - r_j q_i$$

and, more generally, $$V = M - rq^T$$

Thus, Equation 1 can be written equivalently as $$u - d = Vx$$

Figure 8A:
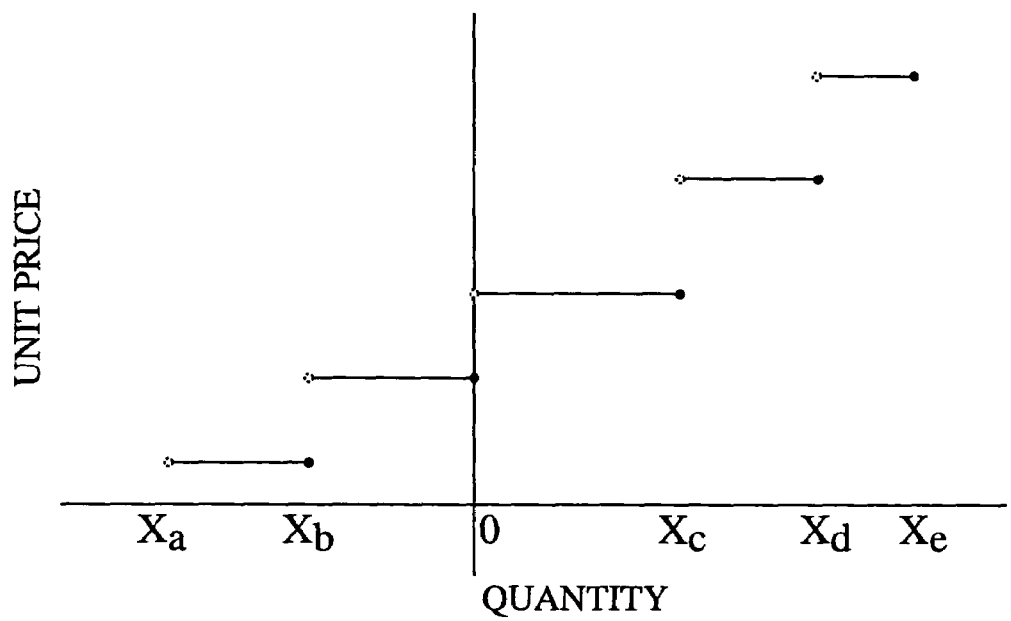
FIGS. 8a and 8b are graphs which model the liquidity costs of holding a given security.

In practice, there may be limits on the sizes of trades that can be executed, or on the price that can be obtained for a particular trade volume. In other words, markets are said to possess finite liquidity. To model finite liquidity, we place limits on the position sizes and assume that the price of a security is an increasing, piecewise constant function of volume as is shown in FIG. 8a. The latter restriction reflects the fact that there is a cost, or a liquidity premium, associated with trading increasingly large quantities of a given security.

Referring to FIG. 8a, up to $x_b$ units of a given security can be sold at a given price while additional units, up to a maximum of $x_a$, can only be sold at a lower price; the first $x_c$ units can be bought at a given price and additional units, up to a maximum of $x_e$, demand increasingly higher prices.

Figure 8B:
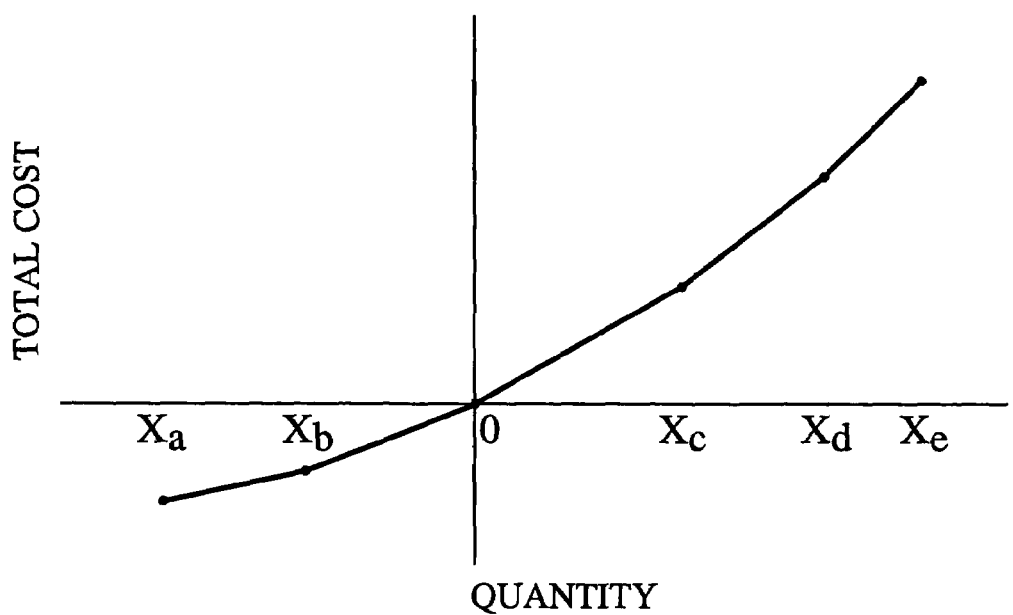

Referring to FIG. 8b, the corresponding total cost function, which plots the cost of trading a given quantity of the security, is piecewise-linear and convex.

This representation allows a security to be decomposed into a series of tranches, each with its own constant price and trading limits, that reflect the actual price/volume behaviour of the security. Each tranche is then modeled as a separate security. For example, the security represented in FIG. 8a consists of five tranches with the following trading limits:

$$(x_a - x_b) \leq x_1 \leq 0$$

$$x_b \leq x_2 \leq 0$$

$$0 \leq x_3 \leq x_c$$

$$0 \leq x_4 \leq (x_d - x_c)$$

$$0 \leq x_5 \leq (x_e - x_d)$$

A position, x, in the security is simply the sum of the positions in the individual tranches:

$$x = x_1 + x_2 + x_3 + x_4 + x_5 \quad (2)$$

More generally, we denote the collective set of lower and upper trading limits for all securities by $x_L$ and $x_U$, respectively. By definition, $(x_U)_i = 0$ for all tranches that correspond to a short position in security i, while $(x_L)_i = 0$ for all tranches that correspond to a long position in security i.

Equation 2 correctly represents the actual position only if the tranches are filled in the proper sequence. That is, if $x_{i-1}$ and $x_i$ represent successive short tranches of a single security, then $x_{i-1} < 0$ only if $x_i = (x_L)_i$. Similarly, if $x_i$ and $x_{i+J}$ represent successive long tranches of a single security, then $x_{i+1} > 0$ only if $x_i = (x_U)_i$. This behaviour is consistent with a convex total cost function (e.g., FIG. 8b), which can be obtained by ensuring that, for each security i, $V_{ji} \geq V_{j,i+1}$ for all j=1,2, ..., s and $V_{ji} > V_{j,i+1}$ for at least one j (i.e., the lower tranche outperforms the higher tranche relative to the benchmark).

In the preferred embodiment of the invention, it is assumed that an investor seeks to maximize the Call Value (expected upside) of a given portfolio subject to not exceeding a specified limit, k, on the Put Value (expected downside) of the given portfolio. The optimal trade-off between the two is found by solving the following linear program, in known manner, which we call the primal problem (relevant dual variables are listed in parentheses):

Problem 2 (primal problem)
maximize$_{(x,u,d)}p^T u$
such that
$p^T d \leq k$ (μ)
$u - d - (M - rq^T)x = 0$ (π)
$-x \leq -x_L$ ($\alpha_L$)
$x \leq x_U$ ($\alpha_U$)
$u \geq 0$
$d \geq 0$ Note that Problem 2 does not contain the complementarity constraint $u^T d = 0$. This constraint can be safely omitted when constructing the Put/Call Efficient Frontier for risk-averse investors.

Solving the linear program above defines one point on the Put/Call Efficient Frontier. Generation of the entire Put/Call Efficient Frontier requires the linear program to be solved for all $k \geq 0$.

Constructing the efficient frontier exactly typically requires the use of parametric programming since k is a continuous variable. Alternatively, one can solve Problem 2 for a finite set of k values and then obtain an approximate efficient frontier by interpolating (e.g. linearly) between the optimal solutions. The resulting approximation can be made more precise by solving the problem for additional intermediate values of k.

Figure 9:
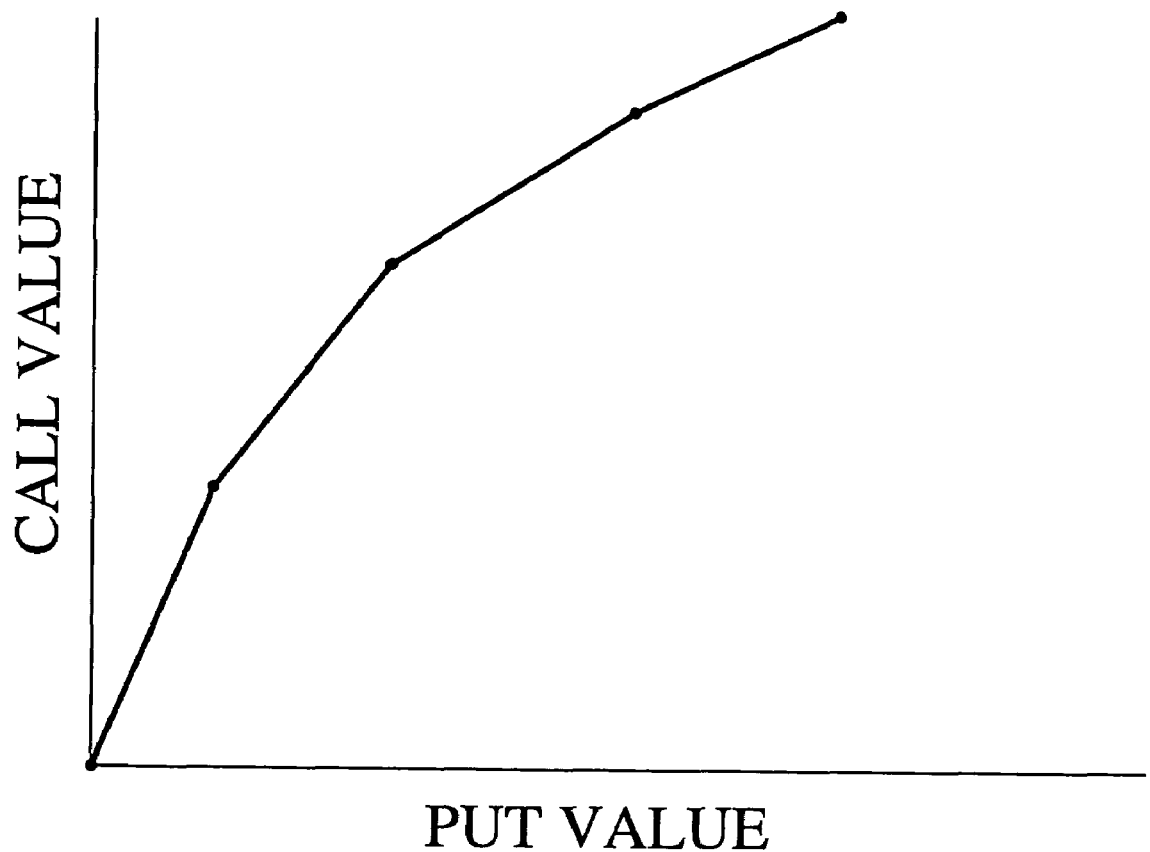
FIG. 9 is a graph illustrating an example of a Put/Call Efficient Frontier.

Referring to FIG. 9, it is evident that the resultant Put/Call Efficient Frontier is concave and piecewise-linear.

In the present invention, an efficient portfolio may now be selected based on expected utility. The Put/Call Efficient Frontier, if it is non-degenerate, identifies an infinite number of efficient portfolios, each providing the maximum amount of expected upside for a given level of expected downside. The selection of a particular efficient portfolio depends on an investor's risk/reward preferences and absolute tolerance level for risk, as measured by the expected downside. Note that by definition, any portfolio not on the Put/Call Efficient Frontier is dominated by an efficient portfolio and will never be selected by an investor.

In the preferred embodiment of the invention, it is assumed that investor will act in a manner that maximizes the value of:

expected utility=(expected upside)−λ(expected downside)

where $\lambda \geq 0$ is a constant representing the investor's degree of risk aversion. Variant embodiments of the invention may incorporate different utility functions or performance measures.

An investor who is highly averse to risk will have a large λ, while an investor who is keen to take risks will have a small λ. In general, we refer to investors as being risk-averse ($\lambda > 1$), risk-neutral ($\lambda = 1$) or risk-seeking ($0 \leq \lambda < 1$). The above equation for expected utility is consistent with a utility function that is bi-linear in gains and losses (relative to the benchmark).

For an efficient portfolio, μ measures the marginal expected upside per unit of expected downside. If the amount of risk that can be tolerated is unlimited, then an investor with risk aversion $\lambda_o$ will select an efficient portfolio with $\mu = \lambda_o$ or, if there is no such portfolio, an efficient portfolio with $\mu > \lambda_o$ and the largest expected upside (or, alternatively, $\mu < \lambda_o$ and the smallest expected upside).

Viewed geometrically, an investor will select the portfolio defined by the point at which a line with slope $\lambda_o$ is tangent to (or more precisely, is a subgradient of) the Put/Call Efficient Frontier.

Figure 11:
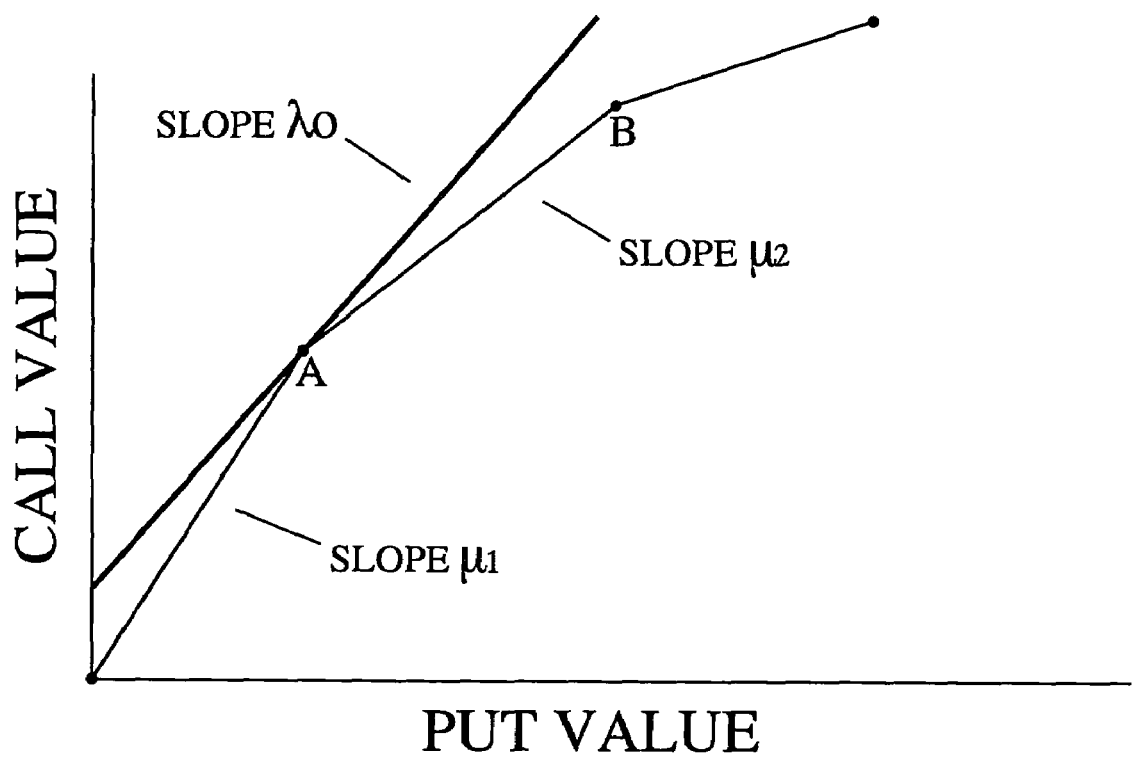
FIG. 11 is a graph illustrating how a portfolio is selected based on utility.

Referring to FIG. 11, for example, an investor with risk aversion $\mu_1 < \lambda_o < \mu_2$ will select the portfolio that corresponds to point A on the Put/Call Efficient Frontier. An investor with $\lambda_o = \mu_1$ will be indifferent among all portfolios on the segment from the origin to point A, while an investor with $\lambda_o = \mu_2$ will be indifferent among all portfolios on the segment between points A and B.

If we restrict our attention to risk-averse investors, it follows that only those segments of the Put/Call Efficient Frontier having slope greater than one are relevant for decision-making purposes. The corresponding efficient portfolios automatically satisfy the complementarity constraint in this case.

However, selecting portfolios based on a bi-linear utility function ignores the fact that there is typically an upper limit on the amount that an investor is prepared to lose (in this context, loss is equivalent to the expected downside relative to a benchmark). For example, while a loss of $50,000 may bankrupt an individual investor, a corporation may be able to withstand losing several million dollars without any adverse effect. Thus, if we are to consider a restriction reflecting an allowable maximum loss, investors will effectively be restricted to portfolios on a truncated Put/Call Efficient Frontier that extends from an expected downside of zero up to some level $k_o$, which corresponds to the maximum loss that can be tolerated.

Figure 12:
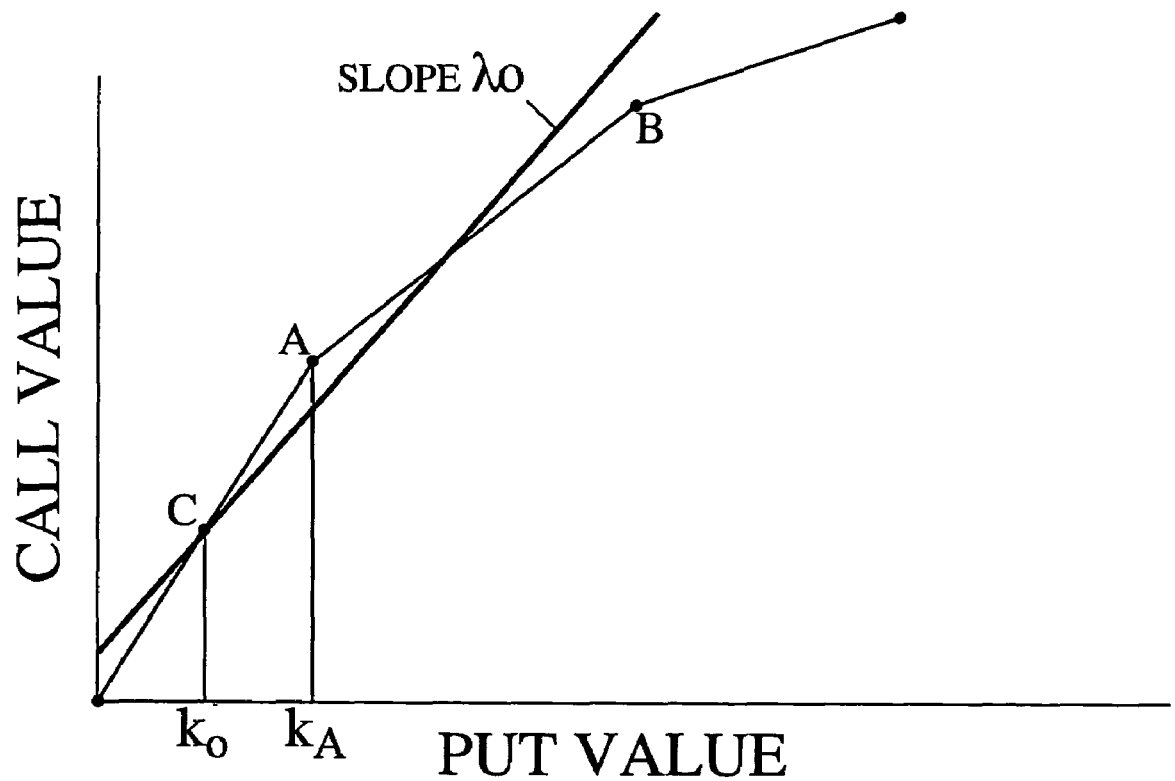
FIG. 12 is a graph illustrating how a portfolio is selected based on utility and absolute risk tolerance.

In contrast to FIG. 11, the example of FIG. 12 shows that an investor with risk aversion $\lambda_o$, where $\mu_1 < \lambda_o < \mu_2$, and maximum loss tolerance $k_o$, where $k_o < k_4$, will be forced to select the portfolio that corresponds to point C, rather than A, on the Put/Call Efficient Frontier. In this case, the maximum loss tolerance level causes the investor to act in a manner that is consistent with an implied risk aversion of $\mu_1$ rather than $\lambda_o$.

Figure 13:
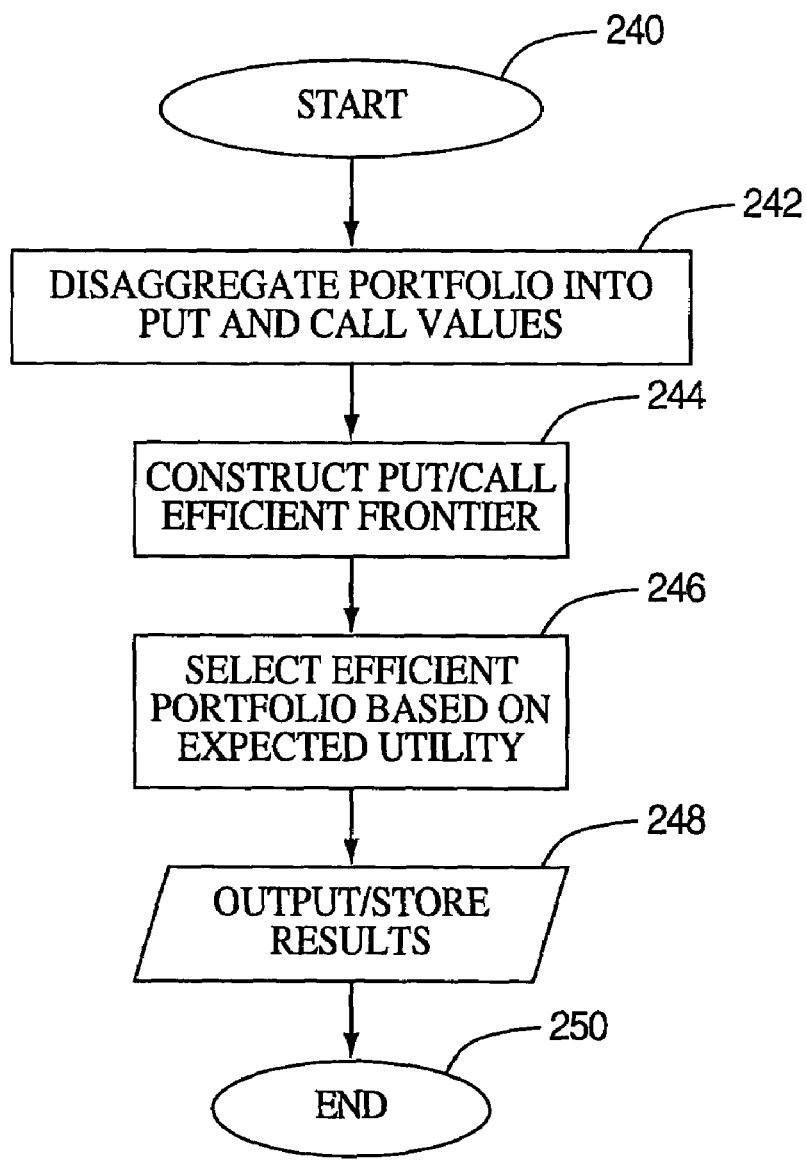
FIG. 13 is a flow chart diagram illustrating the steps performed by the method of use of the present invention.

Referring to FIG. 13, a method of the present invention relating to the selection of efficient portfolios commences at step 240.

Step 242 requires that a portfolio whose data is stored in a MtF cube 120 of FIGS. 5 and 6, be decomposed into its downside losses and upside gains. The decomposition of a portfolio is performed as part of solving the optimization problem. Note that it is not the case that all possible portfolios are decomposed "up front".

At step 244, a Put/Call Efficient Frontier is constructed by solving, using an optimization software package as is known in the art, the linear program as outlined in the mathematical formulation previously described in this specification.

At step 246, an efficient portfolio is selected based on expected utility specified by a given value, or alternatively, based on expected utility specified by a first given value and based on a maximum loss tolerance specified by a second given value.

At step 248, data corresponding to the selected efficient portfolio may subsequently be outputted or stored. The flow of method steps then proceeds to step 250, where the method is terminated.

In variant embodiments of the invention, another approach to determining the portfolio that obtains the best possible score given a performance measure (alternatively put, the highest utility given an investor's utility function) can be used by incorporating the utility function directly into the optimization model and solving a single mathematical program. For example, solving a linear program that maximizes the value of the utility function Call-$\lambda$(Put) for a specified value of $\lambda$ will define an efficient portfolio. This differs from the previous approach described where an efficient frontier defining numerous portfolios that trade off Put and Call Values is constructed, and whereafter an efficient portfolio is selected for a given $\lambda$.

C. Pricing Portfolio Insurance for Arbitrary Portfolios

As a by-product of the optimization model, one can use duality theory, as is known, to price any instrument for which we have a set of Mark-to-Future values.

In particular, one can price an instrument whose payoff matches the downside of a given portfolio under a range of possible future scenarios. In other words, the payoff must equal the downside in exactly those scenarios in which the portfolio incurs downside, and be zero in all upside scenarios (i.e., the insurance exactly offsets losses, and does not pay out otherwise). Thus, given an arbitrary portfolio, the upside and downside payoffs associated with that portfolio can be determined, and subsequently, one can properly price portfolio insurance that will insure an investor against the downside.

The price of the portfolio insurance is not unique, and will depend on the risk preferences of individual investors. The price is correct for an investor who makes decisions based on the performance measure (or utility function) used in the optimization model.

The information necessary to price portfolio insurance is inferred from the problem that is dual to Problem 2. In a manner similar to arbitrage-free pricing, it is possible to derive a set of benchmark-neutral probabilities and infinite-liquidity prices that exactly balance the expected upside and expected downside of all instruments that are included in the optimization problem (i.e., the n securities that are available for constructing the portfolio). The benchmark-neutral probabilities can then be used to obtain prices for new securities that are consistent with an optimal portfolio. A new security is one that was not included in the optimization problem. Given its MtF payoffs, we can calculate the price at which the investor will be indifferent to trading this security; i.e. it is the price at which the investor will have no incentive to either buy or sell the security in order to improve the optimal portfolio (i.e., to obtain a portfolio with higher utility). Suppose an investor with risk aversion $\lambda = 1.5$ solves the optimization problem and obtains an optimal portfolio with utility 100 (note that this utility depends on the investor's $\lambda$). Afterwards, a new company stock gets issued and it is marked-to-future. We can calculate the price for this stock at which it cannot increase the utility of the portfolio beyond 100, so the investor will have no incentive to buy it or short it. This price depends on the investor's $\lambda$ and on the composition of the optimal portfolio.

The mathematical formulation of the relevant problem is described below.

Taking the dual of Problem 2 results in the following linear program (relevant primal variables are listed in parentheses):

Problem 3 (dual problem)

minimize$_{(\mu, \pi, \alpha_L, \alpha_U)}$ $k\mu - (x_L)^T \alpha_L + (x_U)^T \alpha_U$ such that $\alpha_L \alpha_U + (M^T - qr^T)\pi = 0$ (x)

$p\mu - \pi \leq 0$ (d)

$\pi \leq p$ (u)

$\mu, =_L / \alpha_U \leq 0$

Note that the dual problem always has a feasible solution. For example, setting $\lambda_j = p_j$ for all scenarios j, and setting $$(\omega_L)_i = \max\left[-\sum_{j=1}^{s}(M_{ji} - q_i r_j)p_j, 0\right]$$

and $$(\omega_U)_i = \max\left[\sum_{j=1}^{s}(M_{ji} - q_i r_j)p_j, 0\right]$$

for all securities i, satisfies the constraints in Problem 3. Thus, Problem 2, the primal problem, is always bounded and the expected upside is always finite for any amount of expected downside (intuitively, this is due to the fact that liquidity is finite; put another way, only a limited amount of each security can be traded).

Benchmark-Neutral Probabilities and Infinite-Liquidity Prices

The dual constraint for security i is $$(\omega_L)_i - (\omega_U)_i + \sum_{i=1}^{s} (M_{ji} - q_i r_j)\pi_j = 0 \qquad (3)$$

where $(\omega_L)_i$ and $(\omega_U)_i$ are liquidity dual prices. By complementary slackness, $(\omega_L)_i$ and $(\omega_U)_i$ will be zero if security i is strictly between its upper and lower bounds. When there are tranches, it is impossible for all positions to be strictly between their bounds (there cannot be successive partially-filled tranches) and some elements of $\omega_L$ or $\omega_U$ will be positive in this case.

From the weights $\lambda$, we can define a set of benchmark-neutral probabilities $\rho$, where $$\rho_j = \frac{\pi_j}{f}$$

and $$f = \sum_{i=1}^{s} \pi_j.$$

Dividing Equation 3 by the sum of the weights yields $$\frac{(\omega_L)_i}{f} - \frac{(\omega_U)_i}{f} + \sum_{i=1}^{s} (M_{ji} - q_i r_j)\rho_j = 0 \qquad (4)$$

Now, let $$E_\rho(v_{(i)}) = \sum_{i=1}^{s} (M_{ji} - q_i r_j)\rho_j \qquad (5)$$

denote the expected gain, relative to the benchmark, of one unit of security i under the probabilities $\rho$.

From Equations 4 and 5, it follows that $$E_\rho(V_{(i)}) = \frac{(\omega_U)_i}{f} - \frac{(\omega_L)_i}{f} \qquad (6)$$

Thus, when $(\omega_L)_i = (\omega_U)_i = 0$, the benchmark-neutral probabilities $\rho$ satisfy $$E_\rho(V_{(i)}) = 0$$

for security i. The non-zero elements of $\omega_L$ and $\omega_U$ reflect liquidity premiums and discounts, respectively, that are inherent in the observed prices of securities.

If security i is basic in the linear programming sense (all securities that are strictly between their bounds are basic; in the case of degeneracy, securities that are at a bound may also be basic), then the liquidity dual prices $(\omega_L)_i$ and $(\omega_U)_i$ are zero. Thus, basic securities obtain a weighted gain of zero relative to the benchmark under the weights $\pi$, and it follows that they equally trade off expected upside and expected downside under the benchmark-neutral probabilities $\rho$ (i.e., $\rho$ is a Martingale probability measure for the gains of basic securities).

If security i is at its lower bound, then $(\omega_L)_i > 0$ (assuming no degeneracy) and, from Equation 6, it follows that $E_\rho(V_{(i)}) < 0$. That is, under the benchmark-neutral probabilities, security i contributes more expected downside than expected upside. Hence, the size of the position is as small as possible, and will in fact be negative if the security can be shorted. Note that we can express the observed price as $$q_i = \hat{q}_i + \frac{(\omega_L)_i}{r^T \pi}$$

where $\hat{q}_i$ is the infinite-liquidity price and $$\frac{(\omega_L)_i}{r^T \pi}$$

is a liquidity premium.

Note that $\hat{q}_i$ is that price for which security i obtains an expected gain of zero relative to the benchmark under the benchmark-neutral probabilities.

Specifically, there exists a set of gains $$\hat{V}_{ji} = M_{ji} - r_j \hat{q}_i$$

for which $E_\rho(\hat{V}_{(i)}) = 0$.

Conversely, if security i is at its upper bound, then $(\omega_U)_i > 0$ (assuming no degeneracy) and $E_\rho(V_{(i)}) > 0$. In this case, we can write $$q_i = \hat{q}_i - \frac{(\omega_U)_i}{r^T \pi}$$

where $$\frac{(\omega_U)_i}{r^T \pi}$$

is a liquidity discount and, again, $E_\rho(\hat{V}_{(i)}) = 0$.

In summary, the liquidity dual prices allow us to obtain infinite-liquidity prices $\hat{q}$ and a corresponding set of gains $\hat{V}$ that is a Martingale under $\rho$.

Benchmark-Neutral Pricing

For any security i, $$\hat{q}_i = \frac{1}{r_o} M_{(i)}^T \rho \quad (7)$$

where $$r_o = r^T \rho$$

Equation 7 represents benchmark-neutral valuation: the infinite-liquidity price of a security equals its expected payoff over p, discounted at the rate $r_o$. Note that in the case of a complete, infinitely-liquid market with r=1 (when the benchmark is the mark-to-market value of the portfolio), Equation 7 is equivalent to risk-neutral valuation. Benchmark-neutral prices, however, exist even when markets are illiquid and/or incomplete (although the price does depend on the risk preferences of the investor. Benchmark-neutral pricing is equivalent to the concept of utility-invariant pricing, which finds the price $q_h$ at which an investor is indifferent to trading security h in an optimal portfolio. Observe that an investor holding a portfolio that optimally trades off Put Value and Call Value will be inclined neither to buy nor sell security h if $E_\rho(V_{(h)})=0$, which implies that its infinite-liquidity price satisfies Equation 7.

Equation 7 can also be used to price a Put Option and a Call Option by replacing $M_{(i)}$ with the downside (d) and upside (u) payoffs of the portfolio respectively. Note that put/call parity:

$$r_o \rho T u - r_o \rho^T d = r_o \rho^T (M - r q^T) x$$

is a restatement of the complementary slackness condition for the tracking constraints:

$$\pi^T (u - d - (M - r q^T) x) = 0$$

To price portfolio insurance, replace $M_{(i)}$ is replaced with the downside payoffs of the optimal portfolio. Given an arbitrary set of MtF payoffs, we can calculate a price as described earlier in this specification. This price is only relevant in relation to the optimal portfolio—i.e., it is the price at which the investor will be indifferent to trading the new instrument, given that he or she is currently holding the optimal portfolio. If the set of MtF payoffs happen to match the downside payoffs of the optimal portfolio, then purchasing this "instrument" can be interpreted as buying insurance for the optimal portfolio. The price of this instrument is the maximum amount that the investor would be willing to pay in order to avoid any downside, given that the investor is holding the optimal portfolio. Thus, if the payoffs do not exactly match the downside of the optimal portfolio, a price can still be obtained, but the instrument cannot be interpreted as being insurance, strictly speaking, in this case.

Other Properties of the Put/Call Efficient Frontier

Referring again to FIG. 9, the Put/Call Efficient Frontier is concave and piecewise-linear. As the allowable downside k changes, so do the basic instruments and, hence, also the benchmark-neutral probabilities and the dual prices. Specifically, the benchmark-neutral probabilities and the dual prices change only at discrete points (ie., when there is a change in the optimal basis of the linear program), and thus they are effectively step functions, rather than linear functions, of k (they are of the same general form as the function shown in FIG. 8a). To be precise, when referring to these values in the context of the Put/Call Efficient Frontier, it is necessary to define them as explicit functions of k (ie., $\rho(k), \omega_L(k), \omega_U(k), \mu(k)$). However, to simplify the notation, we continue to use our existing convention, with the implicit understanding that the values are consistent with the currently-specified limit for expected downside.

Since the primal and dual objective functions are equal at optimality, it follows from Problems 2 and 3 that for each k, an efficient portfolio satisfies $$\rho^T u = k\mu - (x_L)^T \omega_L + (x_U)^T \omega_U \quad (8)$$

Note that in Equation 8, $\mu$, $\omega_L$ and $\omega_U$ are actually step functions that depend on k. Thus, over each range of k values that leaves the basic securities unchanged, the expected upside is a linear function of the expected downside (i.e., $\rho^T u = k\mu + \theta$, for some constant $\theta$) and so the Put/Call Efficient Frontier is piecewise linear. The slope of the Put/Call Efficient Frontier at the point k equals $\mu$, the marginal expected upside per unit of expected downside. Note that $\mu$ decreases with increasing k and so the Put/Call Efficient Frontier is concave. Intuitively, this occurs because the most attractive opportunities for trading off expected upside and expected downside are used first; as k increases, and the most attractive securities attain their bounds, the marginal expected upside per unit of expected downside ($\mu$) decreases. In contrast, if there are no liquidity constraints (i.e., liquidity is infinite) then, in the absence of arbitrage, the Put/Call Efficient Frontier is a straight line.

Figure 10:
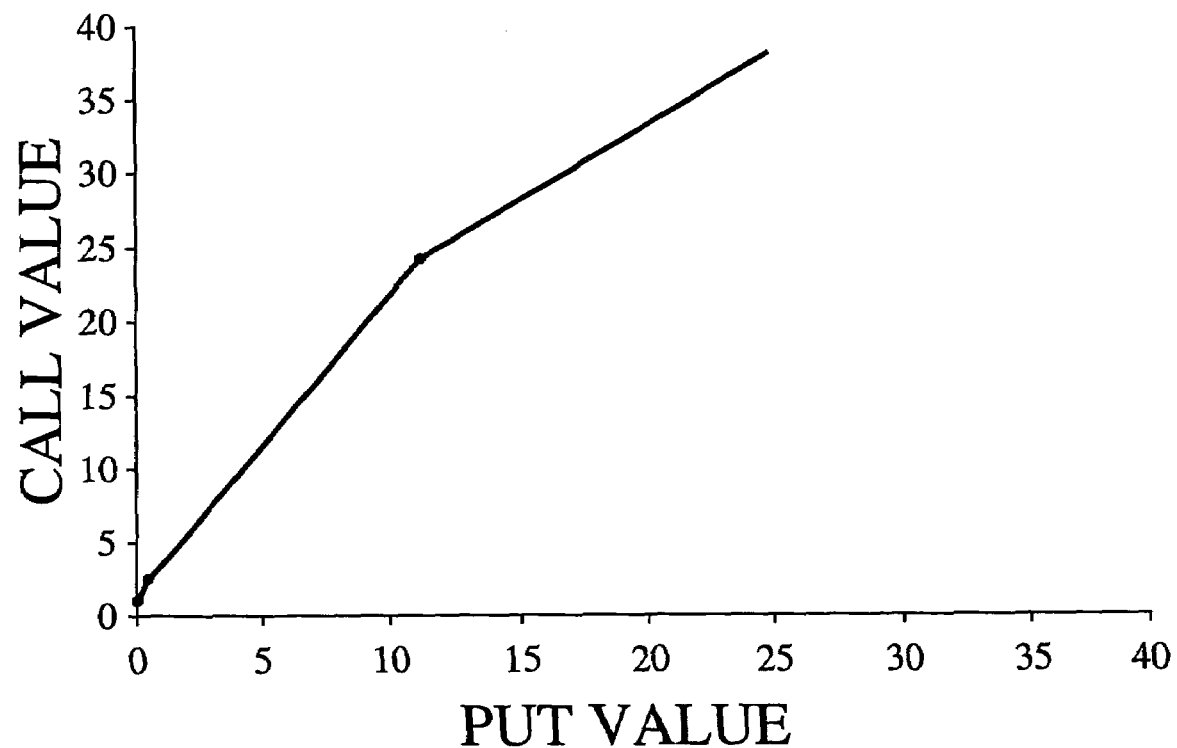
FIG. 10 is a graph illustrating an example of a Put/Call Efficient Frontier showing an arbitrage opportunity.

Equation 8 also indicates that positive expected upside may be attained when k=0, as shown in FIG. 10. This can occur if the tranches nearest to the zero position provide an arbitrage opportunity, which can be exploited until the corresponding securities reach their trading limits. Thus, the Put/Call Efficient Frontier may terminate at a non-zero value on the expected upside axis, rather than at the origin.

The dual problem (Problem 3) includes the constraints $p \leq \pi \leq \mu p$. Thus, it follows that $\mu \geq 1$ and the slope of the Put/Call Efficient Frontier is never less than one (i.e., it is always possible to obtain at least one unit of expected upside per unit of expected downside). This is due to omitting the complementarity constraint in Problem 2; if both upside and downside can be positive in the same scenario, then one can always trade off equal amounts of Put Value and Call Value on a marginal basis (resulting in $\mu=1$). Conversely, if $\mu>1$, then it can never be the case that both upside and downside are positive in the same scenario (i.e., the complementarity constraint is automatically satisfied when $\mu>1$). Only portfolios with $\mu>1$ are relevant for risk-averse investors, which allows the complementarity constraint to be omitted in this case.

The Benchmark-Neutral Put/Call Efficient Frontier

Recall that the benchmark-neutral probabilities and infinite-liquidity prices vary with k (there is a separate set of values for each segment of the Put/Call Efficient Frontier). As shown below, solving the primal problem with any set of benchmark-neutral probabilities together with their corresponding infinite-liquidity prices produces a benchmark-neutral Put/Call Efficient Frontier that is a 45 degree line rooted at the origin.

Let $\rho$ and $\hat{q}$ denote a set of benchmark-neutral probabilities and infinite-liquidity prices, respectively. It can b shown from the equations in the previous section that $$\hat{q} = q + \frac{1}{r^T \pi}(\omega_U - \omega_L)$$

and from the primal problem (Problem 2), it can be shown that $$\rho^T u = \rho^T d + \rho^T (M - r\hat{q}^T) x$$

Substituting this equation into the preceding equation, and using the definition of ρ, yields $$\rho^T u = \rho^T d + [(M^T - r^T q)\pi + \omega_U - \omega_L]^T x$$

Since a dual feasible solution satisfies $$(M^T - qr^T)\pi + \omega_{U-\omega L} = 0$$

it follows that:

$$\rho^T u = \rho^T d$$

Thus, under benchmark-neutral probabilities and infinite liquidity prices, the expected upside equals the expected downside for all portfolios, regardless of the positions taken in the securities. It follows that the Put/Call Efficient Frontier is a 45-degree line rooted at the origin in this case.

It will be apparent to those skilled in the art that the term "value" as used in this specification and in the claims is not limited to reference to a monetary value.

As will be apparent to those skilled in the art, other various modifications and adaptations of the methods described herein are possible with departing from the present invention, the scope of which is defined in the claims.

We claim:

1. A non-variance-based method of determining an optimal portfolio from a plurality of portfolios, wherein the steps of the method are performed by computer, a user directing the computer to compute the optimal portfolio, the method comprising the steps of:
   a) computing a mark-to-future value for each of the plurality of portfolios,
      wherein the mark-to-future value for a portfolio is calculated from mark-to-future values for the instruments in the portfolio, and wherein the mark-to-future value for an instrument is a simulated expected value for the instrument under a future scenario at a time point;
   b) for each of the plurality of portfolios, disaggregating the portfolio such that the portfolio is characterized by an upside value and a downside value,
      wherein the upside value is the expected value, over a plurality of future scenarios, each with an associated probability of future occurrence, of the unrealized gains of the portfolio calculated as the absolute differences between the mark-to-future value of the portfolio and a benchmark value where the mark-to-future value of the portfolio exceeds the benchmark value, and
      wherein the downside value is the expected value, over the plurality of future scenarios, each with an associated probability of future occurrence, of the unrealized losses of the portfolio calculated as the absolute differences between the mark-to-future value of the portfolio and the benchmark value where the benchmark value exceeds the mark-to-future value of the portfolio;
   c) determining at least one efficient portfolio from the plurality of portfolios,
      wherein each efficient portfolio is a portfolio in which the upside value therefor is maximized with the downside value therefor not exceeding a limit of one or more specified limits;
   d) obtaining a utility function provided as input, and selecting an optimal portfolio from the at least one efficient portfolio that maximizes the utility function;
   wherein the determining step comprises solving a linear program defined by:
   maximize $(x,u,d) p^T u$
   such that $p^T d \leq k$      (μ)

$u - d - (M - rq^T)x = 0$      (π)

$-x \leq -x_L$      ($\omega_L$)

$x \leq x_U$      ($\omega_U$)

$u \geq 0$ $d \geq 0$ where
   q is the current mark-to market-values of securities;
   M is the Mark-to-Future values ($M_{ji}$=value of security i in scenario j);
   p is the subjective prior scenario probabilities;
   r is the benchmark growth rates;
   x is the position sizes;
   $x_L$ is the lower position limits;
   $x_U$ is the upper position limits;
   d is the portfolio unrealized loss or downside;
   u is the portfolio unrealized gain or upside.

2. The method of claim 1, further comprising the step of computing the benchmark value by selecting a benchmark instrument or benchmark portfolio, and calculating the mark-to-future value of the selected benchmark instrument or benchmark portfolio.

3. The method of claim 1, wherein the utility function is:

expected utility=(upside value)−λ(downside value), where λ is a constant indicative of a level of risk aversion.

4. The method of claim 1, wherein the determining step comprises solving a mathematical program that incorporates the utility function.

5. The method of claim 1, further comprising the step of determining a price for portfolio insurance associated with the optimal portfolio by pricing a security having payoffs that match the unrealized losses of the optimal portfolio.

6. The method of claim 5, wherein said step of determining the price for portfolio insurance comprises evaluating the formula, $$\hat{q}_i = \frac{1}{r_o} M_{(i)}^T \rho \text{ where } r_o = r^T \rho,$$

and wherein $M_{(i)}$ is replaced with the values of the unrealized losses of said optimal portfolio.

7. The method of claim 1, further comprising the step of determining a price for a new security consistent with the optimal portfolio, the new security having a plurality of mark-to-future values associated therewith.

8. A non-variance-based method of determining an optimal portfolio from a plurality of portfolios, wherein the steps of the method are performed by computer, a user directing the computer to compute the optimal portfolio, the method comprising the steps of:
   a) computing a mark-to-future value for each of the plurality of portfolios,
      wherein the mark-to-future value for a portfolio is calculated from mark-to-future values for the instruments in the portfolio, and wherein the mark-to-future value for an instrument is a simulated expected value for the instrument under a future scenario at a time point;
   b) for each of the plurality of portfolios, disaggregating the portfolio such that the portfolio is characterized by an upside value and a downside value,
      wherein the upside value is the expected value, over a plurality of future scenarios, each with an associated probability of future occurrence, of the unrealized gains of the portfolio calculated as the absolute differences between the mark-to-future value of the portfolio and a benchmark value where the mark-to-future value of the portfolio exceeds the benchmark value, and
      wherein the downside value is the expected value, over the plurality of future scenarios, each with an associated probability of future occurrence, of the unrealized losses of the portfolio calculated as the absolute differences between the mark-to-future value of the portfolio and the benchmark value where the benchmark value exceeds the mark-to-future value of the portfolio;
   c) determining at least one efficient portfolio from the plurality of portfolios,
      wherein each efficient portfolio is a portfolio in which the upside value therefor is maximized with the downside value therefor not exceeding a limit of one or more specified limits;
   d) obtaining a utility function provided as input, and selecting an optimal portfolio from the at least one efficient portfolio that maximizes the utility function;
   e) determining a price for portfolio insurance associated with the optimal portfolio by pricing a security having payoffs that match the unrealized losses of the optimal portfolio, wherein said step of determining the price for portfolio insurance comprises evaluating the formula, $$\hat{q}_i = \frac{1}{r_o} M_{(i)}^T \rho \text{ where } r_o = r^T \rho,$$

and wherein $M_{(i)}$ is replaced with the values of the unrealized losses of said optimal portfolio.

9. The method of claim 8, further comprising the step of computing the benchmark value by selecting a benchmark instrument or benchmark portfolio, and calculating the mark-to-future value of the selected benchmark instrument or benchmark portfolio.

10. The method of claim 8, wherein the utility function is:

expected utility=(upside value)−λ(downside value), where λ is a constant indicative of a level of risk aversion.

11. The method of claim 8, wherein the step of determining at least one efficient portfolio comprises solving a mathematical program that incorporates the utility function.

12. The method of claim 8, further comprising the step of determining a price for a new security consistent with the optimal portfolio, the new security having a plurality of mark-to-future values associated therewith.

13. A non-variance-based method of determining an optimal portfolio from a plurality of portfolios, wherein the steps of the method are performed by computer, a user directing the computer to compute the optimal portfolio, the method comprising the steps of:
   a) computing a mark-to-future value for each of the plurality of portfolios,
      wherein the mark-to-future value for a portfolio is calculated from mark-to-future values for the instruments in the portfolio, and wherein the mark-to-future value for an instrument is a simulated expected value for the instrument under a future scenario at a time point;
   b) for each of the plurality of portfolios, disaggregating the portfolio such that the portfolio is characterized by an upside value and a downside value,
      wherein the upside value is the expected value, over a plurality of future scenarios, each with an associated probability of future occurrence, of the unrealized gains of the portfolio calculated as the absolute differences between the mark-to-future value of the portfolio and a benchmark value where the mark-to-future value of the portfolio exceeds the benchmark value, and
      wherein the downside value is the expected value, over the plurality of future scenarios, each with an associated probability of future occurrence, of the unrealized losses of the portfolio calculated as the absolute differences between the mark-to-future value of the portfolio and the benchmark value where the benchmark value exceeds the mark-to-future value of the portfolio;
   c) determining at least one efficient portfolio from the plurality of portfolios,
      wherein each efficient portfolio is a portfolio in which the downside value therefor is minimized with the upside value therefor being at least a limit of one or more specified limits;
   d) obtaining a utility function provided as input, and selecting an optimal portfolio from the at least one efficient portfolio that maximizes the utility function;
   wherein the determining step comprises solving a linear program defined by:
   maximize $(x,u,d) p^T d$
      such that $p^T d \leq k$      (μ)

$u - d - (M - rq^T)x = 0$      (π)

$-x \leq -x_L$      ($\omega_L$)

$x \leq x_U$      ($\omega_U$)

$u \geq 0$ $d \geq 0$ where
   q is the current mark-to-market values of securities;
   M is the Mark-to-Future values ($M_{ji}$=value of security i in scenario j);

p is the subjective prior scenario probabilities;
r is the benchmark growth rates;
x is the position sizes;
$x_L$ is the lower position limits;
$x_U$ is the upper position limits;
d is the portfolio unrealized loss or downside;
u is the portfolio unrealized gain or upside.

14. The method of claim 13, further comprising the step of computing the benchmark value by selecting a benchmark instrument or benchmark portfolio, and calculating the mark-to-future value of the selected benchmark instrument or benchmark portfolio.

15. The method of claim 13, wherein the utility function is:

expected utility=(upside value)−λ(downside value), where λ is a constant indicative of a level of risk aversion.

16. The method of claim 13, wherein the determining step comprises solving a mathematical program that incorporates the utility function.

17. The method of claim 13, further comprising the step of determining a price for portfolio insurance associated with the optimal portfolio by pricing a security having payoffs that match the unrealized losses of the optimal portfolio.

18. The method of claim 17, wherein said step of determining the price for portfolio insurance comprises evaluating the formula, $$\hat{q}_i = \frac{1}{r_o} M_{(i)}^T \rho \text{ where } r_o = r^T \rho,$$

and wherein $M_{(i)}$ is replaced with the values of the unrealized losses of said optimal portfolio.

19. The method of claim 13, further comprising the step of determining a price for a new security consistent with the optimal portfolio, the new security having a plurality of mark-to-future values associated therewith.

20. A non-variance-based method of determining an optimal portfolio from a plurality of portfolios, wherein the steps of the method are performed by computer, a user directing the computer to compute the optimal portfolio, the method comprising the steps of:
   a) computing a mark-to-future value for each of the plurality of portfolios,
      wherein the mark-to-future value for a portfolio is calculated from mark-to-future values for the instruments in the portfolio, and wherein the mark-to-future value for an instrument is a simulated expected value for the instrument under a future scenario at a time point;
   b) for each of the plurality of portfolios, disaggregating the portfolio such that the portfolio is characterized by an upside value and a downside value,
      wherein the upside value is the expected value, over a plurality of future scenarios, each with an associated probability of future occurrence, of the unrealized gains of the portfolio calculated as the absolute differences between the mark-to-future value of the portfolio and a benchmark value where the mark-to-future value of the portfolio exceeds the benchmark value, and
      wherein the downside value is the expected value, over the plurality of future scenarios, each with an associated probability of future occurrence, of the unrealized losses of the portfolio calculated as the absolute differences between the mark-to-future value of the portfolio and the benchmark value where the benchmark value exceeds the mark-to-future value of the portfolio;
   c) determining at least one efficient portfolio from the plurality of portfolios,
      wherein each efficient portfolio is a portfolio in which the downside value therefor is minimized with the upside value therefor being at least a limit of one or more specified limits;
   d) obtaining a utility function provided as input, and selecting an optimal portfolio from the at least one efficient portfolio that maximizes the utility function;
   e) determining a price for portfolio insurance associated with the optimal portfolio by pricing a security having payoffs that match the unrealized losses of the optimal portfolio, wherein said step of determining the price for portfolio insurance comprises evaluating the formula, $$\hat{q}_i = \frac{1}{r_o} M_{(i)}^T \rho \text{ where } r_o = r^T \rho,$$

and wherein $M_{(i)}$ is replaced with the values of the unrealized losses of said optimal portfolio.

21. The method of claim 20, further comprising the step of computing the benchmark value by selecting a benchmark instrument or benchmark portfolio, and calculating the mark-to-future value of the selected benchmark instrument or benchmark portfolio.

22. The method of claim 20, wherein the utility function is:

expected utility=(upside value)−λ(downside value), where λ is a constant indicative of a level of risk aversion.

23. The method of claim 20, wherein the step of determining at least one efficient portfolio comprises solving a mathematical program that incorporates the utility function.

24. The method of claim 20, further comprising the step of determining a price for a new security consistent with the optimal portfolio, the new security having a plurality of mark-to-future values associated therewith.

25. A non-variance-based method of evaluating a portfolio, wherein the steps of the method are performed by computer, a user directing the computer to compute performance measures for the portfolio, the method comprising the steps of:
   a) computing a mark-to-future value for the portfolio, wherein the mark-to-future value for a portfolio is calculated from mark-to-future values for the instruments in the portfolio, and wherein the mark-to-future value for an instrument is a simulated expected value for the instrument under a future scenario at a time point;
   b) disaggregating the portfolio such that the portfolio is characterized by an upside value and a downside value,
      wherein the upside value is the expected value, over a plurality of future scenarios, each with an associated probability of future occurrence, of the unrealized gains of the portfolio calculated as the absolute differences between the mark-to-future value of the portfolio and a benchmark value where the mark-to-future value of the portfolio exceeds the benchmark value, and wherein the downside value is the expected value, over the plurality of future scenarios, each with an associated probability of future occurrence, of the unrealized losses of the portfolio calculated as the absolute differences between the mark-to-future value of the portfolio and the benchmark value where the benchmark value exceeds the mark-to-future value of the portfolio; and c) computing one or more performance measures for the portfolio, each performance measure calculated as a function of at least one of the upside and downside values for the portfolio;

wherein the one or more performance measures comprises at least one measure selected from the following group:
   i) downside value;
   ii) upside value;
   iii) upside value−downside value;
   iv) upside value/downside value; and
   v) upside value−$\lambda$(downside value), where $\lambda$ is a constant indicative of a level of risk aversion.

26. The method of claim 25, further comprising the step of computing the benchmark value by selecting a benchmark instrument or benchmark portfolio, and calculating the mark-to-future value of the selected benchmark instrument or benchmark portfolio.

27. The method of claim 25, further comprising the steps of:
   repeating steps a) through c) for each portfolio in a plurality of portfolios;
   ordering the plurality of portfolios according to at least one of the one or more performance measures; and
   selecting a portfolio from the ordered portfolios.

* * * * *

UNITED STATES PATENT AND TRADEMARK OFFICE
CERTIFICATE OF CORRECTION

PATENT NO.       : 7,171,385 B1
APPLICATION NO.  : 09/718500
DATED            : January 30, 2007
INVENTOR(S)      : Ron S. Dembo and Helmut Mausser It is certified that error appears in the above-identified patent and that said Letters Patent is hereby corrected as shown below:

In Column 6, lines 35, 52, and 59 replace: "MtP" with --MtF--

In Column 11, line 29 replace: "MtP" with --MtF--

In Column 11, line 31 replace: "portfolio Liquidity" with --portfolio. Liquidity--

In Column 12, line 4 replace: "qi,qi" with --$q_l$, $q_l$--

In Column 13, line 10 replace: "$(x_a-x_b) \leq x_1 0$" with --$(x_a-x_b) \leq x_1 \leq 0$--

In Column 13, line 32 replace: "$x_{i+j}$" with --$x_{i+1}$--

In Column 13. line 49 replace: "maximize$_{(x, u, d)}$P$^T$u" with --maximize$_{(x, u, d)}$p$^T$u--

In Column 13, line 52 replace: "u-d-(M-rq$^{T)x=}$0 ($\pi$)" with --u-d-(M-rq$^T$)x=0 ($\pi$)--

In Column 13, line 53 replace: "-x $\leq$ -$x_L$ ($\alpha_L$)" with -- -x $\leq$ -$x_L$ ($\omega_L$) --

In Column 13, line 54 replace: "x $\leq$ $x_U$ ($\alpha_U$)" with --x $\leq$ $x_U$ ($\omega_U$)--

In Column 16, line 41 replace: "minimize$_{(\mu,\pi,\alpha_L,\alpha_U)} k\mu - (x_L)^T \alpha_L + (x_U)^T \alpha_U$" with --minimize$_{(\mu,\pi,\omega_L,\omega_U)} k\mu - (x_L)^T \omega_L + (x_U)^T \omega_U$--

In Column 16, line 43 replace: "$\alpha_L . \alpha_U + (M^T - qr^T)\pi = 0$" with --$\omega_L - \omega_U + (M^T - qr^T)\pi = 0$--

In Column 16, line 44 replace: "$p\mu - \pi \leq 0$" with -- $p\mu - \pi \geq 0$--

In Column 16, line 45 replace: "$\pi \leq p$" with -- $\pi \geq p$--

In Column 16, line 46 replace: "$\mu, =_L /\alpha_U \leq 0$" with -- $\mu, \omega_L, \omega_U \geq 0$--

In Column 16, line 49 replace: "$\lambda_j = p_j$" with --$\pi_j = p_j$--

In Column 17, line 10 replace; "$(\omega_L)_i - (\omega_U)_i + \sum_{i=1}^{s} (M_{ji} - q_i r_j)\pi_j = 0$" with --$(\omega_L)_i - (\omega_U)_i + \sum_{j=1}^{s} (M_{ji} - q_i r_j)\pi_j = 0$--

In Column 17, line 39 replace: "$f = \sum_{i=1}^{s} \pi_j$" with --$f = \sum_{j=1}^{s} \pi_j$--

UNITED STATES PATENT AND TRADEMARK OFFICE
CERTIFICATE OF CORRECTION

PATENT NO.         : 7,171,385 B1
APPLICATION NO. : 09/718500
DATED                  : January 30, 2007
INVENTOR(S)        : Ron S. Dembo and Helmut Mausser It is certified that error appears in the above-identified patent and that said Letters Patent is hereby corrected as shown below:

In Column 17, line 45 replace: " $\frac{(\omega_L)_i}{f} - \frac{(\omega_U)_i}{f} + \sum_{i=1}^{s}(M_{ji} - q_i r_j)\rho_j = 0$ " with -- $\frac{(\omega_L)_i}{f} - \frac{(\omega_U)_i}{f} + \sum_{j=1}^{s}(M_{ji} - q_i r_j)\rho_j = 0$ --

In Column 17, line 55 replace: "$E_P(V_{(j)}) = \sum_{i=1}^{s}(M_{ji} - q_i r_j)\rho_j$" with -- $E_P(V_{(i)}) \sum_{j=1}^{s}(M_{ji} - q_i r_j)\rho_j$ --

In Column 19 line 15 replace: "over p" with --over $\rho$--

In Column 19, line 21 replace: "investor." with --investor).--

In Column 19, line 34 replace: "$r_o \rho T u - r_o \rho^T d = r_o \rho^T (M - rq^T)x$" with
--$r_o \rho^T u - r_o \rho^T d = r_o \rho^T (M - rq^T)x$--

In Column 19, line 38 replace: "$\pi^T (u - d - (M - rq^T)x) = 0$" with
--$\pi^T (u - d - (M - rq^T)x) = 0$--

In Column 19, line 39 replace: "replace $M_{(i)}$" with --$M_{(l)}$--

In Column 20, line 66 replace: "It can b shown" with --It can be shown--

In Column 21, line 17 replace: "$(M^T - qr^T)\pi + \omega_{U\text{-}\omega L} = 0$" with
--$(M^T - qr^T)\pi + \omega_U - \omega_L = 0$--

In Column 22, line 15 replace: "maximize $(x,u,d)p^T u$" with --maximize$_{(x,u,d)} p^T u$--

In Claim 13, line 51 replace: "maximize $(x,u,d)p^T d$" with --minimize$_{(x,u,d)} p^T d$--

UNITED STATES PATENT AND TRADEMARK OFFICE
CERTIFICATE OF CORRECTION

PATENT NO. : 7,171,385 B1
APPLICATION NO. : 09/718500
DATED : January 30, 2007
INVENTOR(S) : Ron S. Dembo and Helmut Mausser It is certified that error appears in the above-identified patent and that said Letters Patent is hereby corrected as shown below:

In Claim 13 line 53 replace: "$p^T d \leq k$" with --$p^T u \geq k$--

Signed and Sealed this

Twenty-second Day of May, 2007

JON W. DUDAS
*Director of the United States Patent and Trademark Office*